(12) United States Patent
Hayakawa et al.

(10) Patent No.: US 7,206,109 B2
(45) Date of Patent: Apr. 17, 2007

(54) MODULE FOR OPTICAL INFORMATION READER

(75) Inventors: Hiroshi Hayakawa, Saitama (JP); Toru Takahashi, Kawaguchi (JP); Kentaro Takahashi, Tokorozawa (JP)

(73) Assignee: Optoelectronics Co., Ltd., Saitama (JP)

( * ) Notice: Subject to any disclaimer, the term of this patent is extended or adjusted under 35 U.S.C. 154(b) by 95 days.

(21) Appl. No.: 10/487,808

(22) PCT Filed: Sep. 2, 2002

(86) PCT No.: PCT/JP02/08864

§ 371 (c)(1),
(2), (4) Date: Feb. 26, 2004

(87) PCT Pub. No.: WO03/019463

PCT Pub. Date: Mar. 6, 2003

(65) Prior Publication Data

US 2004/0240205 A1    Dec. 2, 2004

(30) Foreign Application Priority Data

Aug. 31, 2001 (JP) .............................. 2001-264556

(51) Int. Cl.
*G02B 26/08* (2006.01)
(52) U.S. Cl. .................. 359/212; 359/198; 359/819
(58) Field of Classification Search ............. None
See application file for complete search history.

(56) References Cited

U.S. PATENT DOCUMENTS 4,547,038 A * 10/1985 Mori ..................... 359/204
5,381,438 A    1/1995 Guo et al.
5,905,751 A    5/1999 Huang et al.
6,025,963 A *  2/2000 Hippenmeyer et al. ..... 359/819

FOREIGN PATENT DOCUMENTS

| EP | 0 028 108 A1 | 5/1981 |
| EP | 0 945 819 A2 | 9/1999 |
| JP | 56-71621 | 6/1981 |
| JP | 7-261109 | 10/1995 |
| JP | 8-129600 | 5/1996 |
| JP | 8-315061 | 11/1996 |
| JP | 11-213086 | 8/1999 |
| JP | 11-326805 | 11/1999 |
| JP | 2000-75226 | 3/2000 |
| JP | 2000-298242 | 10/2000 |
| JP | 2001-215425 | 8/2001 |
| JP | 2001 215425 A | 8/2001 |
| WO | WO 98/47377 A | 10/1998 |

* cited by examiner

*Primary Examiner*—James Phan
(74) *Attorney, Agent, or Firm*—Westerman, Hattori, Daniels & Adrian, LLP

(57) ABSTRACT

A module for an optical information reader, wherein a light emitting unit (22), a collimator lens (23), a vibration mirror (31) for scanning, a condensing mirror (40), and a light receiving unit (50) are installed in a module casing (10) for modularization, and a lens-barrel hole (13*b*) opening at one end thereof and having an aperture (13*a*) formed at the tip face thereof is provided in the module casing (10), the collimator lens (23) is installed in the lens-barrel hole (13*b*) so as to come into contact with the tip bottom part thereof, and the light emitting unit (22) is press-fitted into the press-fit part (13*c*) of the lens-barrel hole in front of the collimator lens to form a laser beam generating part (20).

4 Claims, 16 Drawing Sheets

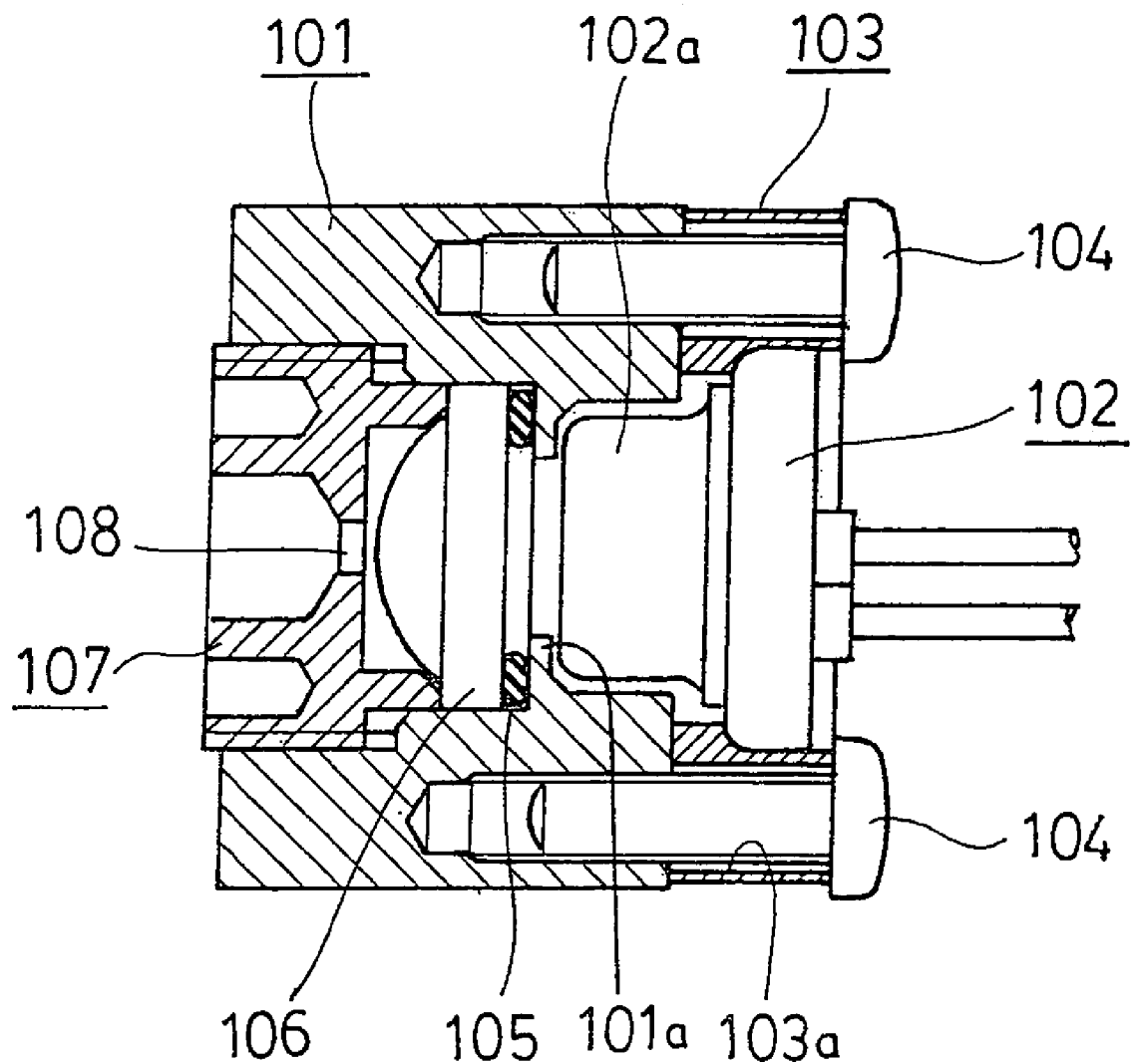

MODULE FOR OPTICAL INFORMATION READER

TECHNICAL FIELD

The present invention relates to a module for an optical information reader in which primary components in the optical information reader that optically reads information of an object to be read such as a bar code or the like having portions with different light reflectances by scanning it with a light beam and outputs code data indicating the information of the object to be read are installed in a common module casing.

BACKGROUND TECHNOLOGY

As optical information readers, bar code readers that read bar codes indicating information such as names, prices, and so on of products are in wide use in the distribution industry and the retail industry.

These bar code readers are broadly classified into a hand type and a fixed type, and further the hand type includes a pen type, a touch type, and a light beam scanning type (laser type). The fixed type is a light beam scanning type designed to be capable of scanning in a plurality of directions.

Among these readers, an optical information reader that is a target of the invention is one corresponding to the hand type bar code reader by the light beam scanning type.

The bar code reader of the light beam scanning type brings laser light generated by a light source such as laser diode (semiconductor laser) or the like into beam form, deflects the light beam by a reflecting mirror to cause it to impinge on a bar code, rotates or vibrates (oscillates) the reflecting mirror to scan the bar code in such a manner that the light beam traverses the bar code.

Then, reflected light from the bar code is condensed and received by a receiving sensor to be converted into an electric signal. The electric signal is subjected to A/D conversion and encoded, and outputted as bar code read information.

Typical light beam scanning mechanisms used in such a conventional optical information reader of the light beam scanning type are one using a polygon mirror and a rotary drive motor and one using a single face mirror and a galvano motor.

Each of these light beam scanning mechanisms, however, is difficult to be reduced in dimensions in its height direction (direction of a rotation shaft) and a direction orthogonal thereto because the polygon mirror and the rotary drive motor or the single face mirror and the galvano motor are separated bodies which are coupled to each other by a rotation shaft directly or via a reduction mechanism.

Hence, to solve such a disadvantage of the conventional light beam scanning mechanism, the present inventor et al. provided vibration mirror type scanner that is reduced in size by integrating a reflecting mirror, a movable magnet, and a rotation shaft (see JP H7-261109 and JP H8-129600).

Whereas, in the market thereafter, for further enhancement of convenience of such an optical information reader, further expansion of uses, and creation of new type of usage, it is demanded to further reduce in size, thickness, and weight a vibration mirror scanning part forming a core part of the reader. Therefore, the present inventor et al. further develop and provide for the market a vibration mirror type scanner intended to achieve the aforementioned reduction in size, thickness, and weight and coping with the need for further improvement in scanning frequency and a maximum scanning angle of a light beam and the need for correction control of scanning characteristics and temperature characteristics of the beam (see JP H11-213086).

Further, as a technique on the reduction in size, thickness, and weight of the optical information reader that is the demand of the market, there provided is a one-piece optical assembly for an optical scanner (see JP H11-326805), a retroreflection scanning module for an electro-optic reader (see JP 2000-298242), or the like as one in which a laser diode, a light detector, various optical elements, and so on are positioned and accommodated in a molded resin member for assembly or modularization.

On the other hand, in the optical information reader of the light beam canning type, it is necessary that a light emitting unit with a laser diode as a light source, a collimator lens for bringing laser light emitted by the laser diode into a parallel luminous flux, and a member provided with an aperture for emitting the resulting laser light in a thin beam are positioned and secured in a lens-barrel with their optical axes coinciding one another.

Collimator lenses are not uniform in size (for example, diameter) and have some error, and therefore it is necessary to give slight room to the inner diameter of the lens-barrel so that all of the collimator lenses can be fitted thereinto. Further, there is a small but real error in the positional accuracy of the laser diode in the light emitting unit. To correct these errors, means for correcting the optical axis is required.

Therefore, for example, a structure shown in FIG. 31 has been employed as the structure of a conventional laser beam generating part. Specifically, a flange for optical axis adjustment 103 is adhered to a light emitting unit 102, a light emitting part 102a of the light emitting unit 102 is inserted into a lens-barrel 101 provided in a casing whose illustration is omitted from one end face side thereof, and the flange for optical axis adjustment 103 is secured to the lens-barrel 101 with screws 104. Further, an O-ring 105 and a collimator lens 106 are inserted into the lens-barrel 101 from the other end face side, and an aperture ring 107 with an aperture 108 formed at the center is screwed into the lens-barrel 101 so that the collimator lens 106 is sandwiched and secured between the aperture ring 107 and a flange part 101a in the lens-barrel 101 with the O-ring 105 giving preload thereto.

In this event, the screw-in amount of the aperture ring 107 is adjusted so that a light emitting point of the light emitting unit 102 is at a position slightly farther than a focus point of the collimator lens 106. Further, the attachment position in the diameter direction of the light emitting unit 102 by the flange for optical axis adjustment 103 and the screws 104 is adjusted so that the optical axes of the collimator lens 106 and light emitting unit 102 coincide with each other. For that purpose, the inner diameter of a screw insertion hole 103a of the flange for optical axis adjustment 103 is made larger than the outer diameter of the screw 104, thereby enabling fine adjustment of the attachment position in the diameter direction of the light emitting unit 102.

However, since the demanded accuracy of attachment of the light emitting unit and collimator lens in the laser beam generating part is very high, it is difficult to achieve the demanded accuracy of optical axis adjustment and focus adjustment in this kind of conventional attachment structure. In addition, as shown in FIG. 31, the flange for optical axis adjustment 103 for adjusting the optical axis of a laser is adhered to the rear part of the light emitting unit 102 and both are screwed to the end face of the lens-barrel 101, and therefore the number of components necessarily increases and screwed parts occupy a large capacity, leading to an obstacle to a reduction in size and price.

Hence, there also is a reader in which the optical axis adjustment mechanism is omitted to reduce the size and the number of components of the laser beam generating part. This, however, increases variations in the optical axis, resulting in variations of about ±4° in the scan direction.

Besides, enhanced reading accuracy of the bar code symbol might cause wrong information to be also read. There can be as well printing nonuniformity of the bar code symbol and ink scattered to spaces in the bar code symbol as blurred black bars and so on. Further, optical noise is also caused by a speckle pattern (grain-like flicker occurring when a laser beam is applied) generated by a laser beam on bar code paper surface. There is a problem that even though the above-described defects are small enough not be recognized by the naked eye, a reader with enhanced reading accuracy may catch them as signals.

It is difficult to avoid such optical noise in the optical information reader of the scanning type by a laser beam, but it is desirable to decrease its influence as much as possible.

Besides, in a module for an optical information reader in recent years, an LSI (large-scale integration circuit) is used to process an electric signal made from reflected light from a bar code detected by a light receiving sensor or to control respective parts in the module.

Typically, this LSI is mounted on a circuit board that is to be attached to the top or the side of the main body of the module.

However, depending on the use environment of the optical information reader, various kinds of electronic devices are often used, and there is a serious problem that the above-described LSI is affected by the electromagnetic wave noise caused by these devices. In addition, since mobile phones have become widespread and are used not only for a simple telephone function but also as information terminals, existence of a plurality of mobile phones in a work area is not uncommon, and therefore it is also necessary to consider the influence of electromagnetic wave noise caused by those phones.

Hence, to avoid those noises, the LSI mounted on the top or the side of the module main body is covered with a metal plate for shield in the prior art.

However, the module becomes bulky by the volume of the metal plate in addition to the thickness of the LSI, leading to one of the obstacles to a reduction in size. In addition, the need for the metal plate increases the number of components as well as the number of attachment steps thereof.

It is an object of the invention to modularize the primary part of an optical information reader of the light beam scanning type, simplify the structures of attachment parts of a light emitting unit and a collimator lens, and enable read with highly accuracy, so as to reduce the size and price of the optical information reader. It is another object to eliminate most of the variation with time and the influence of the above-described optical noise and electromagnetic wave noise, so as to enable information read with high accuracy for a long time.

DISCLOSURE OF THE INVENTION

To attain the above-described objects, the present invention is characterized in that a module for an optical information reader in which at least a light emitting unit with a laser diode as a light source, a collimator lens, a vibration mirror for scanning, a condensing mirror or a condensing lens, and a light receiving unit are installed in a module casing for modularization, is configured as follows.

Specifically, the module casing is provided with a lens-barrel hole having an opening at one end face thereof and an aperture formed at a tip face thereof and having a press-fit part, provided between the opening and the tip face, into which the light emitting unit is to be press-fitted, the collimator lens is adhered to a tip bottom part of the lens-barrel hole, and the light emitting unit is press-fitted into the press-fit part in order to position a light emitting point of the laser diode slightly farther than a focus point of the collimator lens, to thereby form a laser beam generating part.

It is preferable that to configure the lens-barrel hole such that an inner peripheral face of the press-fit part is a cylindrical face with an inner diameter almost the same as an outer diameter of the light emitting unit that is to be press-fitted thereinto, and an inner peripheral face near the opening is a tapered face gradually increasing in inner diameter toward the opening.

Further, it is preferable that a cylindrical lens assembly comprising a plurality of cylindrical lens pieces integrally joined is provided between the light emitting unit and the vibration mirror, and each of the plurality of cylindrical lens pieces has one face that forms a cylindrical concave surface having the same curvature and a different center position and another face that is a flat surface orthogonal to an optical axis, so that one of the plurality of cylindrical lens pieces is selected and inserted into a passing position of a laser beam generated by the light emitting unit to enable adjustment of an optical axis of the laser beam.

Alternatively, each of the plurality of cylindrical lens pieces forming the cylindrical lens assembly has one face that forms a cylindrical concave surface having the same curvature and the same center position and another face that is a flat surface tilting at a different angle to a curve direction of the cylindrical concave surface with respect to a direction orthogonal to an optical axis, so that one of the plurality of cylindrical lens pieces is selected and inserted into a passing position of a laser beam generated by the light emitting unit to enable adjustment of an optical axis of the laser beam.

In these modules for optical information readers, it is possible that the plurality of cylindrical lens pieces forming the cylindrical lens assembly are four or more triangular cylindrical lens pieces, and the cylindrical lens pieces are joined such that two sides of each of the cylindrical lens pieces are adjacent to two sides of other cylindrical lens pieces to form the cylindrical lens assembly in one polygon.

Further, it is also adoptable that the plurality of cylindrical lens pieces are four square cylindrical lens pieces, and the cylindrical lens pieces are joined such that two orthogonal sides of each of the cylindrical lens pieces are adjacent to two sides of other cylindrical lens pieces to form the cylindrical lens assembly in one square.

Alternatively, it is also possible that each of the plurality of cylindrical lens pieces is a circular cylindrical lens piece, and the cylindrical lens pieces are joined and held on one plane using a support member to form the one cylindrical lens assembly.

Furthermore, the module casing is made of metal and formed with an LSI accommodating recessed part, a circuit board with a shield layer and an LSI mounted thereon for forming a circuit for signal processing and control is attached to an open face of the module casing with the LSI accommodated in the LSI accommodating recessed part, and the LSI is shielded with the metal face of the module casing and the shield layer of the circuit board, whereby the LSI can be completely prevented from being affected by electromagnetic wave noise.

Combination of the above configurations can provide a more desirable module for an optical information reader.

BRIEF DESCRIPTION OF DRAWINGS

FIG. 31 is a cross-sectional view showing a structure example of a laser beam generating part in a conventional optical information reader.

BEST MODE FOR CARRYING OUT THE INVENTION

An embodiment of a module for an optical information reader according to the invention will specifically be described below with reference to the drawings.

Figure 1:
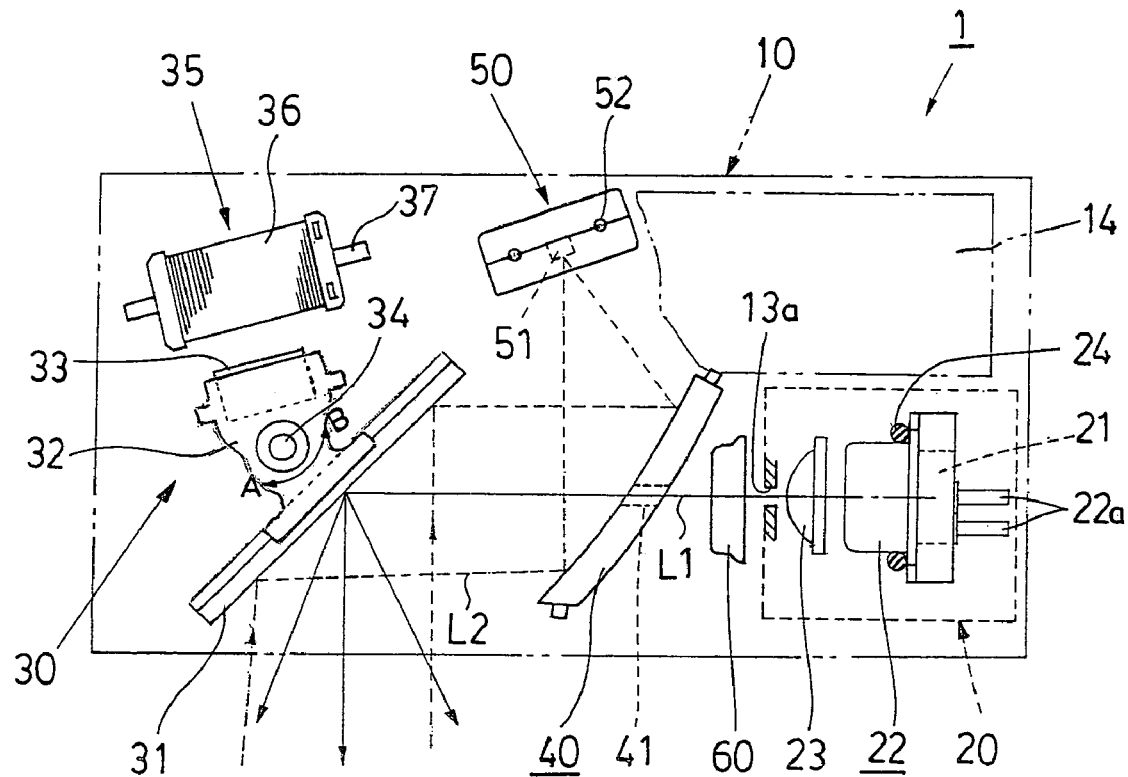
FIG. 1 is a plan view showing placement of components except a circuit board in a module of an embodiment of a module for an optical information reader according to the invention.
Figure 2:
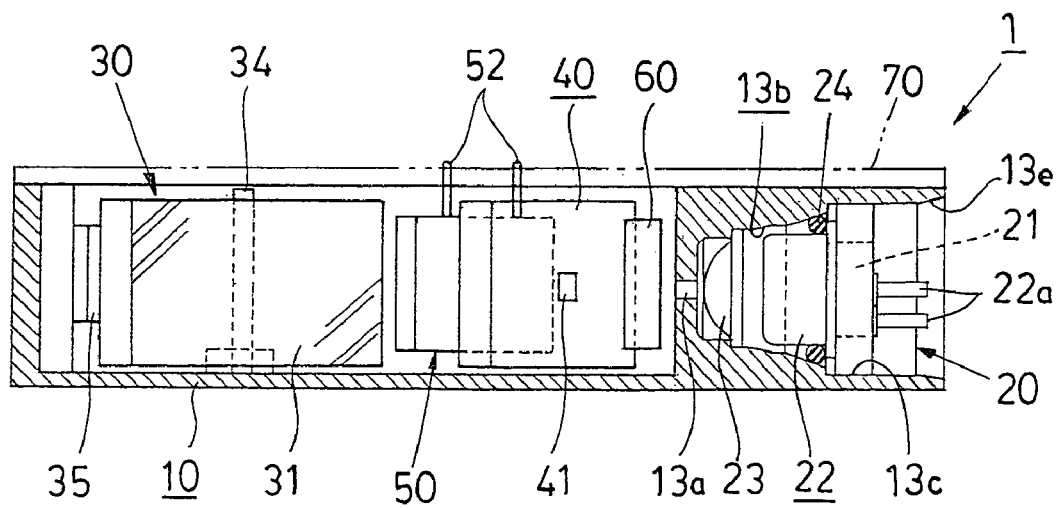
FIG. 2 is a front view showing the module of the same together with a longitudinal cross section of a module casing.
Figure 3:
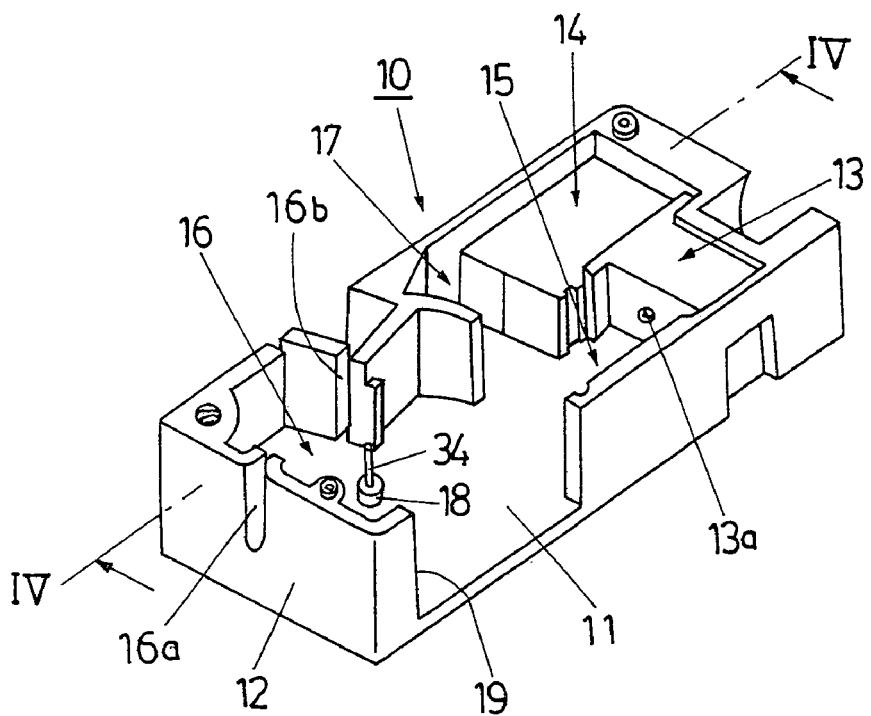
FIG. 3 is a perspective view showing the external appearance only of the module casing of the same.
Figure 4:
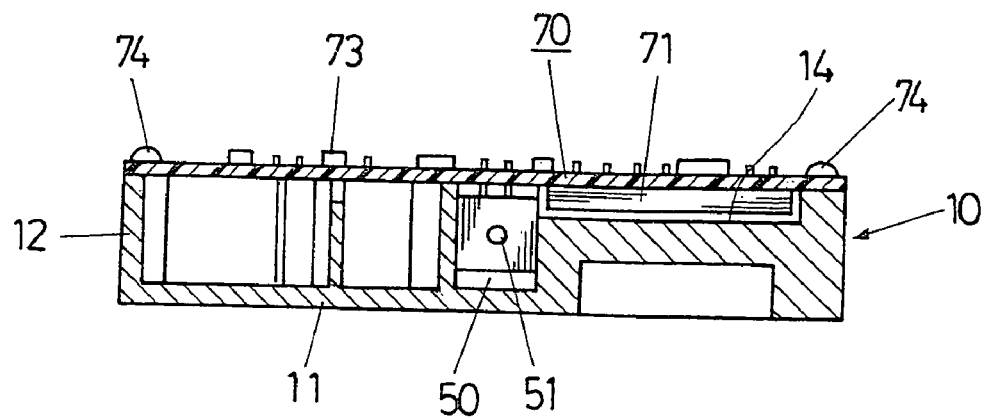
FIG. 4 is a cross-sectional view taken along a line IV—IV in FIG. 3 showing a state in which a circuit board is attached to the top face of the module casing.

FIG. 1 is a plan view showing placement of components except a circuit board in the module for the optical information reader, in which only the outline of a module casing is shown by an imaginary line. FIG. 2 is a front view of the same, showing the longitudinal cross section of the module casing. FIG. 3 is a perspective view showing the external appearance only of the module casing, and FIG. 4 is a cross-sectional view showing the cross-sectional view along a line IV—IV in FIG. 3 in a state in which the circuit board is attached to the top face of the module casing.

The module for the optical information reader (hereinafter referred to only as a "module") 1 is composed of, as shown in FIG. 1 and FIG. 2, a module casing 10, and a laser beam generating part 20, a vibration mirror driver 30, a concave condensing mirror 40, a light receiving unit 50, a cylindrical lens assembly 60 for optical axis correction (hereinafter abbreviated as a "CR lens assembly"), and a circuit board 70 to be attached to the top face of the module casing 10, which are installed in the module casing 10.

The module casing 10 is formed of a zinc alloy called ZDC2 by a die cast process, and has a size of 14 mm in depth (D), 28 mm in width (W), and 8 mm in height (H) as the whole outer shape. In place of the zinc alloy, aluminum or aluminum alloys, or magnesium alloys may be used. Note that the reason why the casing is formed of such metals is to obtain sufficient accuracy and strength and to achieve a later-described shield effect for LSI. When the achievement of the shield effect is separately considered, the casing may be formed of a resin such as reinforced plastic.

Further, as shown in FIG. 3, a sidewall part 12 surrounding a bottom face part 11 and its periphery, a laser beam generating part accommodation part 13, an LSI accommodating recessed part 14, a lens/mirror attachment part 15, a vibration mirror driver attachment part 16, a light receiving unit attachment part 17, and so on, are formed in this example. On the bottom face part 11 at the vibration mirror driver attachment part 16, a boss 18 is formed so that a support shaft 34 of a vibration mirror is to be implanted therein. The front face of the sidewall part 12 corresponding to the vibration mirror driver attachment part 16 is open to form an opening part 19 for emission/incidence of a laser beam. The laser beam generating part accommodation part 13 has an aperture 13a for emission of a laser beam formed in the inner face.

The laser beam generating part 20 is composed of a light emitting unit 22 including a laser diode 21, a collimator lens 23, and an O-ring 24, which are secured in a lens-barrel hole 13b formed as shown in FIG. 2 at the laser beam generating part accommodation part 13 of the module casing 10. The details of this attachment structure and attachment method will be described later. The light emitting unit 22 has three terminals 22a projecting rearward (only two are viewed since two of the three terminals overlap each other in the drawing).

The vibration mirror driver 30 is composed of, as shown in FIG. 1, a vibration mirror 31 made of metal, resin, or glass for scanning a laser beam, a vibration mirror holding member 32 made of resin with the vibration mirror 31 fixed to the front face part thereof, a movable magnet (permanent magnet) 33 fixed to the rear face side of the vibration mirror holding member 32, the support shaft 34 in a pin shape for turnably supporting the vibration mirror holding member 32, and a coil unit 35 located in such a manner as to be opposed and parallel to and spaced from the movable magnet 33. In the coil unit 35, a yoke 37 is provided through a coil 36 in a vertical direction to a winding direction of the coil 36.

These are attached to the vibration mirror driver attachment part 16 of the module casing 10. Then, the movable magnet 33 and the coil unit 35 are operated to vibrate the vibration mirror holding member 32 and the vibration mirror 31 fixed thereto in a seesaw manner as shown by arrows A and B. The configuration and operation will be described later.

At the lens/mirror attachment part 15 of the module casing 10, the CR lens assembly 60 is fixed to the outside of the face formed with the aperture 13a of the laser beam generating part accommodation part 13, and the concave condensing mirror 40 is obliquely fixed in such a manner as to be spaced from the CR lens assembly 60 and opposed to the vibration mirror 31 and the light receiving unit 50. In the central part of the condensing mirror 40, a square through hole 41 is formed for allowing a laser beam to pass therethrough. The configuration and operation of the CR lens assembly 60 for optical axis correction will be described later in detail.

The light receiving unit 50 has a light receiving element 51 such as a photodiode or the like and is installed at the light receiving unit attachment part 17 of the module casing 10, and its two terminals 52 are connected to the circuit board 70.

The function of the module 1 thus configured will be described mainly using FIG. 1.

The laser beam generating part 20 generates a laser beam by light emission of the laser diode that is the light source in the light emitting unit 22, brings the laser beam into a parallel luminous flux by the collimator lens 23 and emits it through the aperture 13a as a laser beam L1 show by a solid line.

The laser beam L1 is subjected to correction of deviation of its optical axis and brought into an elliptical luminous flux extended in the vertical direction by the CR lens assembly 60, passes through the through hole 41 in the condensing mirror 40 to reach the vibration mirror 31, and is reflected by vibration of the vibration mirror 31 within a predetermined angle range around 90° to be emitted from the opening part 19 to the outside. The laser beam irradiates a not-shown bar code symbol.

The bar code symbol forms a plurality of black and white vertical stripes each having a predetermined width that is determined by standards as well known. These are called black bars and spaces. By the black bars and spaces, light having a different reflectance is reflected.

A beam L2 reflected from the bar code symbol passes through the opening part 19 again and is incident on and reflected by the vibration mirror 31. The reflected light is condensed by the condensing mirror 40. In this event, the vibration mirror 31 vibrates due to a magnetic force generated between the coil unit 35 and the movable magnet 33, and thus allows reflected light within a wide range from the bar code symbol to be incident thereon and sent to the condensing mirror 40. All the light condensed by the condensing mirror 40 is then sent to the light receiving element 51 of the light receiving unit 50 (traces of the beams are shown by broken lines).

The light receiving unit 50 outputs an electric signal corresponding to the intensity of light received by the light receiving element 51 and sends the electric signal to the circuit board 70 through the terminals 52. The electric signal is subjected there to A/D conversion and then digital signal processing, whereby read data of the bar code symbol can be obtained.

On the circuit board 70, a not-shown required wiring pattern is formed, and various electronic components 73 in chip forms are attached as shown in FIG. 4, and, on the rear side thereof, an LSI 71 for serving a central function such as signal processing and control is installed.

The circuit board 70 is then attached and fixed to the top face of the module casing 10 with a plurality of screws 74 to thereby serve also as a top cover of this module. In this event, the LSI 71 is accommodated, not projecting to the outside, in the LSI accommodating recessed part 14 of the module casing 10. In addition, the LSI 71 is accommodated in the recessed part 14 of the module casing 10 made of metal to be surrounded by metal faces at least at four outer peripheral faces for desirable shielding, and thus can be prevented from being affected by electromagnetic wave noise generated by other electronic equipment, mobile phone, and so on. This effect will be described later in detail.

This module for the optical information reader 1 can be installed in a not-shown case together with a power source and so on to thereby complete with ease an optical information reader such as a small hand type bar code reader or the like.

Next, the attachment structure and attachment method of the light emitting unit 22 and the collimator lens 23 in the laser beam generating part 20 according to this embodiment will be described with reference to FIG. 5 and FIG. 6.

Figure 5:
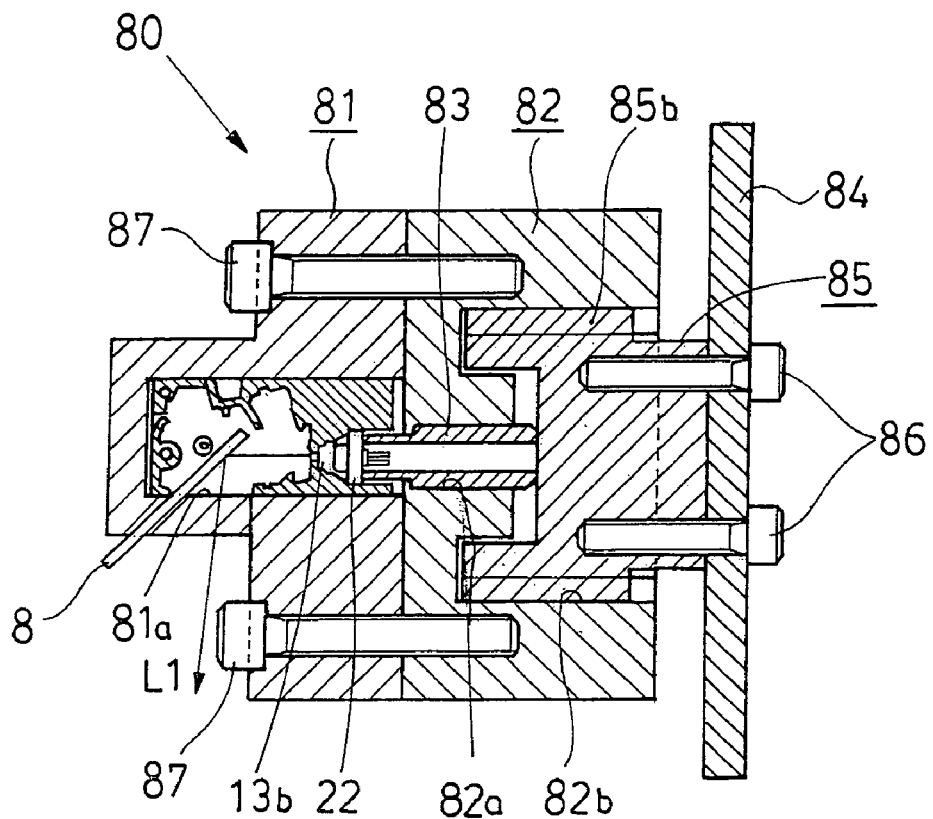
FIG. 5 is a cross-sectional view showing a state in which a light emitting unit is press-fitted using a jig into a lens-barrel hole in the module casing.
Figure 6:
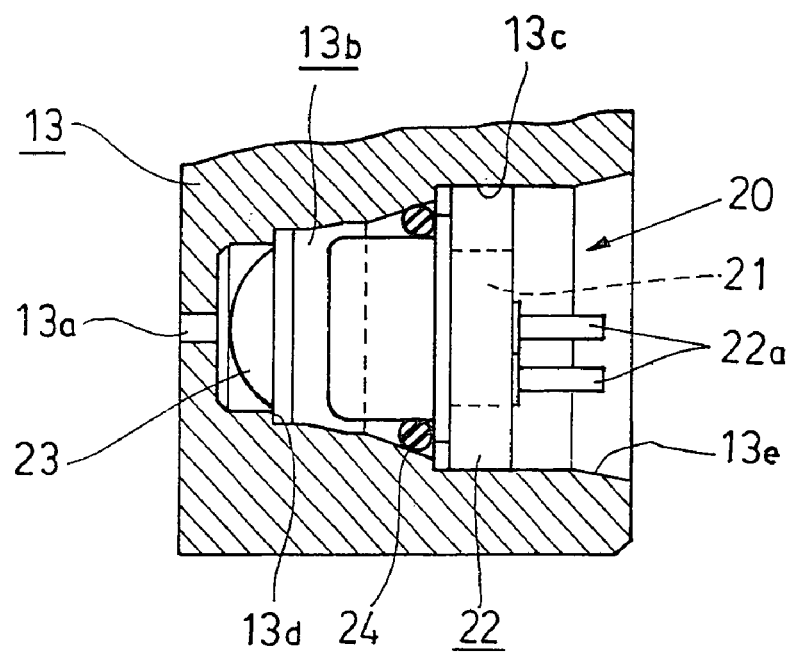
FIG. 6 is an enlarged cross-sectional view showing a state in which the installation of the light emitting unit and a collimator lens into the lens-barrel hole has been completed.

FIG. 5 is a cross-sectional view showing a state in which the light emitting unit is press-fitted using a jig into the lens-barrel hole provided in the module casing, and FIG. 6 is an enlarged cross-sectional view showing a state in which the installation of the light emitting unit and the collimator lens into the lens-barrel hole has been completed.

A press-fitting jig 80 shown in FIG. 5 is a device capable of press-fitting a member with a physical pressure. This press-fitting jig 80 comprises a first securing member 81, a second securing member 82, a pressure shaft 83, a handle 84 with a pressing member 85 integrally fixed thereto with bolts 86, and so on.

The first securing member 81 is provided with a module setting recessed part 81a into which the module casing 10 can be inserted to be held therein. The central part of the second securing member 82 is provided with a shaft guide hole 82a into which the pressure shaft 83 is inserted to be movable in its axial direction. There is a female threaded hole 82b therearound. The pressing member 85 is formed with a male thread 85b at the outer periphery that is designed to be screwed into the female threaded hole 82b of the second securing member 82.

The first securing member 81 and the second securing member 82 are integrally fixed to each other with a plurality of bolts 87.

On the other hand, in the laser beam generating part accommodation part 13 of the module casing 10, the lens-barrel hole 13b is formed, as shown in FIG. 6, in which the light emitting unit 22 and the collimator lens 23 should be accommodated.

The lens-barrel hole 13b has an opening at one end face of the module casing 10 and the aperture 13a formed at the tip face thereof and has, between the opening and the tip face, a press-fit part 13c into which the light emitting unit 22 is to be inserted. The inner peripheral face of the press-fit part 13c is a cylindrical face with an inner diameter slightly smaller than the outer diameter of the light emitting unit 22 that is to be inserted thereinto, and a tapered press-fit guide part 13e is formed near the opening of the lens-barrel hole 13b that has an inner peripheral face gradually increasing in inner diameter toward the opening.

The press-fit part 13c of the lens-barrel hole 13b is formed into a tapered face that is slightly inclined by several microns such that the inner diameter on the front side is slightly large and decreases little by little toward the bottom side, which can also facilitate press-fitting of the light emitting unit 22.

To a stepped part 13d at the tip bottom part of the lens-barrel hole 13b, the collimator lens 23 is sealed and adhered with a UV adhesive. Thereafter, the light emitting unit 22 is lightly inserted together with the dustproof O-ring 24 into the tapered press-fit guide part 13e.

After the module casing 10 in this state is inserted into and supported by the module setting recessed part 81a of the first securing member 81 of the press-fitting jig 80 as shown in FIG. 5, the tip part of the pressure shaft 83 is permitted to abut on the rear end face of the light emitting unit 22, and the pressing member 85 is screwed into the second securing member 82 with the handle 84 grasped. Note that the illustration of the collimator lens 23 is omitted in FIG. 5 for convenience of illustration.

With rotation of the handle 84, the pressure shaft 83 is pressed by the pressing member 85 to move leftward in FIG. 5, so that its tip part presses the rear end face of the light emitting unit 22 to press-fit the light emitting unit 22 to the bottom side of the lens-barrel hole 13b. The pressure shaft 83 is in the shape of a hollow cylinder, and thus allows the terminals 22a projecting from the rear end face of the light emitting unit 22 to escape into the hollow and connect to lead wires, so that the laser diode 21 in the light emitting unit 22 can be supplied with power from the outside for light emission.

At this moment, since the vibration mirror 31 is not installed yet in the module casing 10, a focusing mirror 8 is inserted to reflect the laser beam L1 emitted via the collimator lens 23 and the aperture 13a and guide it to the outside, the light emitting unit 22 is positioned at a point where a light emitting point of the installed laser diode reaches a position that is slightly farther than a focus point of the collimator lens 23, while accurately measuring the diameter of the laser beam L1 using a laser beam measuring device (not shown), and then operation of the handle 84 is stopped. At this point of time, the installation of the light emitting unit 22 is completed. The laser beam emitted from the laser diode and passes through the collimator lens 23 in this event has a profile that slightly converges from a parallel luminous flux. The focusing mirror 8 is removed after the adjustment.

In this state, the dustproof O-ring 24 is sandwiched between the stepped part of the light emitting unit 22 and the tapered inner wall face of the lens-barrel hole 13b to be slightly compressed to seal the space on the collimator lens 23 side, thereby preventing entrance of dust.

The attachment structure and attachment method of the light emitting unit 22 and the collimator lens 23 in the laser beam generating part 20 are designed as described above, whereby the number of components in use is greatly reduced from that in the prior art, and the space for screwing also becomes unnecessary, resulting in a great contribution to a reduction in cost and size of the optical information reader.

Specifically, six components and two screws are used in the conventional structure shown in FIG. 31, but, according to the invention, it becomes possible to configure the structure through use of four components including the laser beam generating part accommodation part 13 of the module casing 10 as shown in FIG. 6.

Next, the CR lens assembly 60 for optical axis adjustment shown in FIG. 1 will be described in detail with reference to FIG. 7 to FIG. 19.

The diameter of the collimator lens 23 for use in the laser beam generating part 20 shown in FIG. 1 has a difference about 0.02 mm between the maximum and the minimum generated in the manufacturing process. To fit every one of these lenses into the lens-barrel hole 13b of the module casing 10, it is necessary to provide a clearance between the collimator lens 23 and the module casing 10. The provision of the clearance results in the collimator lens 23 having an optical axis deviation of about 0.0205 mm. Further, the positional accuracy of the light emitting point of the laser diode of the light emitting unit 22 is typically ±0.080 mm. Therefore, the maximum angle of tilt of the optical axis in the laser beam generating part 20 can be obtained by the following equation.

$$\tan^{-1}[(0.0205+0.08+0.005)/2.4]=2.517°$$

It should be noted that, in this equation, "0.005" is the amount of core deviation (±0.005 mm) between the fitting part of the collimator lens in the lens-barrel hole 13b and the press-fit part 13c of the light emitting unit, and "2.4" is a focal distance (mm) of the collimator lens produced by a glass mold.

Besides, in the vibration mirror driver 30, where the axis deviation due to the support shaft 34 into which the vibration mirror holding member 32 is fitted is 0.4°, and the axis deviation due to a maximum tilt of adherence of the vibration mirror 31 is 0.4°, the tilt of the optical axis at the vibration mirror driver 30 is, $$0.4+0.4=0.8°$$

Accordingly, the maximum tilt of the optical axis as a whole is 3.317°.

It is preferable to correct the tilt to make the optical axis straight and emit the beam from the module casing 10. In this embodiment, the optical axis correction is performed through use of the CR lens assembly 60. Further, the concave surface of the CR lens assembly 60 is used to emit a circular laser beam generated by the laser beam generating part 20 as an elliptic beam longer than it is wide.

Figure 7:
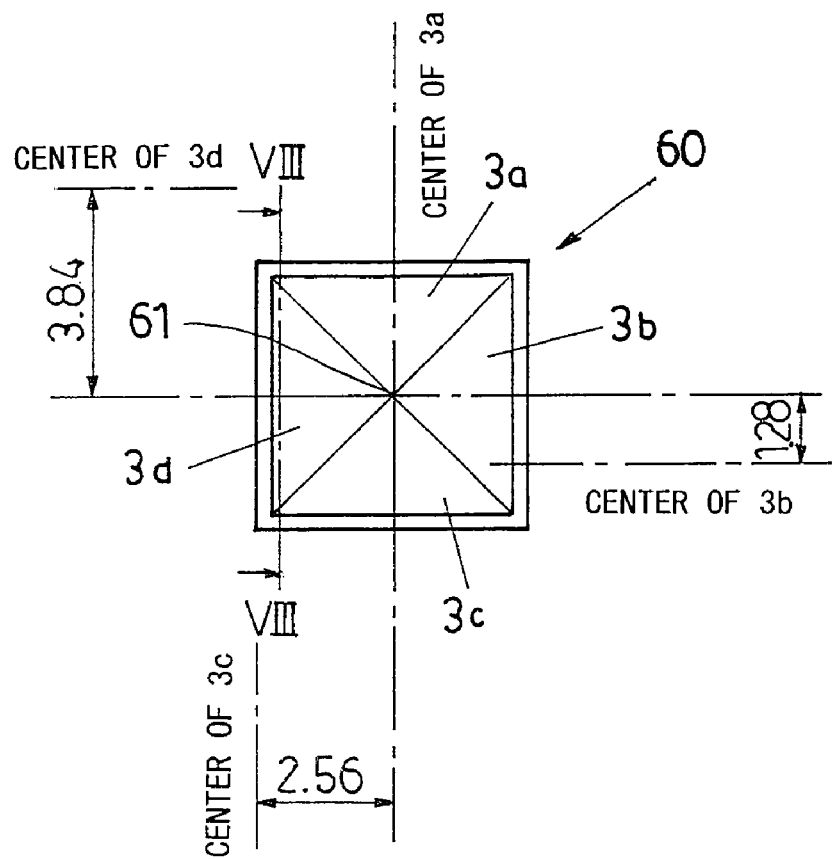
FIG. 7 is a front view of a cylindrical lens assembly 60 shown in FIG. 1.
Figure 8:
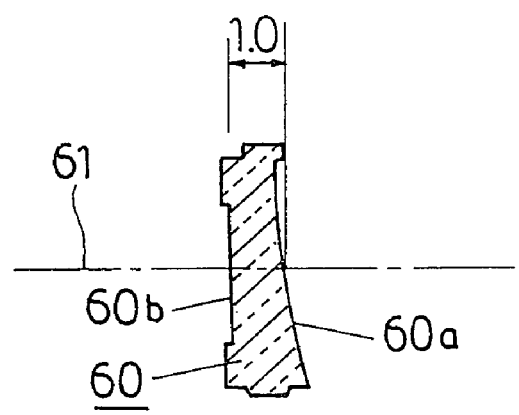
FIG. 8 is a cross-sectional view taken along a line VIII—VIII in FIG. 7.

FIG. 7 is a front view of the CR lens assembly 60 shown in FIG. 1, and FIG. 8 is a cross-sectional view taken along a line VIII—VIII in FIG. 7.

As for the CR lens assembly 60, a plurality of cylindrical lens pieces (hereinafter, abbreviated as "CR lens pieces") are integrally joined to form one CR lens assembly 60. In the example shown in FIG. 7, four right triangular CR lens pieces 3a, 3b, 3c, and 3d are joined in a manner that two sides of each one are adjacent to two sides of others to form one square CR lens assembly.

Each of the four CR lens pieces 3a, 3b, 3c, and 3d has one face 60a (a face on the right side in FIG. 8) that forms a cylindrical concave surface (round surface: R surface) having the same curvature and a different center position as shown in FIG. 7, and another face 60b (a face on the left side in FIG. 8) that is a flat surface orthogonal to the optical axis (coincident with a mechanical axis 61 in the example in FIG. 8).

Further, these CR lens pieces 3a, 3b, 3c, and 3d can be produced by cutting them out of one cylindrical lens. Alternatively, they are cut out of cylindrical lenses having R surfaces with the same curvature, which eliminates the necessity to cut them out of the same one cylindrical lens.

In the CR lens piece 3a, the offset of the center position of the R surface from the mechanical axis 61 passing through the center of the CR lens assembly 60 shown in FIG. 7 is 0, the center position of the CR lens piece 3a is a position that includes the center of the CR lens assembly 60, that is, the position on the line linking the center of the CR lens assembly 60 and the middle point of a side of the CR lens piece 3a on the outside that is not joined to another. The other CR lens pieces 3b, 3c, and 3d are cut out of the same cylindrical R lens in such a manner that the center positions of the respective R surfaces increasingly deviate by 1.28 mm each from the positions including the center of the CR lens assembly 60 similar to the above-described in directions in which the sides on the outside extend. In other words, as shown in FIG. 7, the respective center positions of the CR lens pieces deviate from the mechanical axis 61 passing through the center of the CR lens assembly 60 in the directions in which the sides on the outside of the respective lens pieces extend by 1.28 mm for the CR lens piece 3b, 2.56 mm for the piece 3c, and 3.84 mm for the piece 3d.

Further, the thickness of the R surface at the center of the mechanical axis of the CR lens pieces 3a, 3b, 3c, and 3d forming the CR lens assembly 60 is 1.0 mm each.

Figure 9:
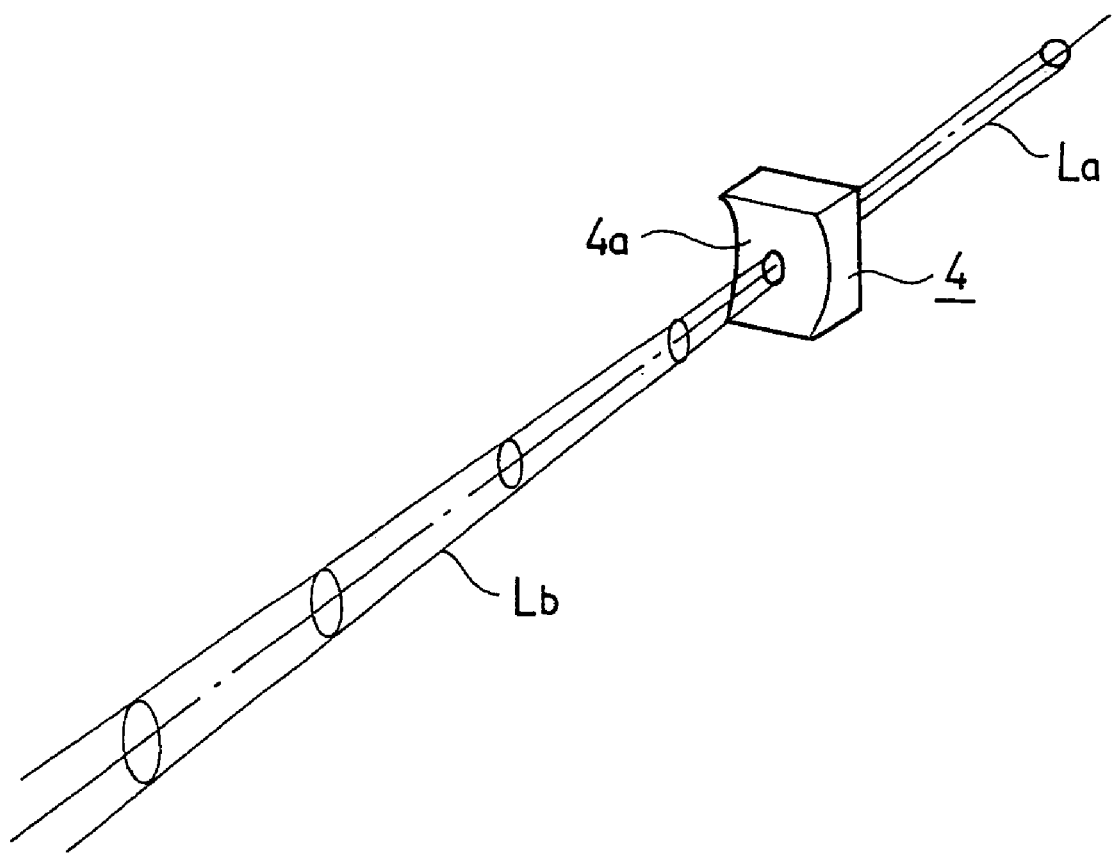
FIG. 9 is a schematic view showing an appearance of a laser beam passing through one cylindrical lens.

Here, the appearance of a case where a laser beam passes through one CR lens is shown in FIG. 9. It will be recognized that a circular laser beam La is deformed into an elliptical laser beam Lb longer than it is wide by a cylindrical concave surface (R surface) of one face (face on the front side) 4a of a CR lens 4. Therefore, no matter which CR lens piece constituting the CR lens assembly 60 the circular laser beam passes through, the laser beam becomes an elliptical laser beam longer than it is wide as long as the curve direction of the R surface of the CR lens piece is in the vertical direction.

The CR lens assembly 60 is installed after adjustment at the time of assembly of the module 1. The laser beam from the light emitting unit 22 is ideally emitted horizontally with respect to the optical axis. However, there are subtle variations as described above, and therefore the adjustment is different among individual laser beams.

Hence, the CR lens assembly 60 is set between the aperture 13a of the light emitting unit 22 and the vibration mirror 31 at a position as close as possible to the aperture 13a, and is rotated 90° each time around the mechanical axis 61 so that the four CR lens pieces 3a, 3b, 3c, and 3d having the respective different center positions of the R surfaces are selectively inserted in sequence into a laser beam passing position, so that a CR lens piece by which variations of beams become smallest is selected for adjustment. When the CR lens piece 3a is selected, the optical axis is not adjusted, and when the CR lens pieces 3b, 3c, and 3d are selected, the optical axis is adjusted by 1°, 2°, and 3° respectively in this example. Once set at the time of assembly, this adjustment does not need to be performed thereafter.

Figure 10:
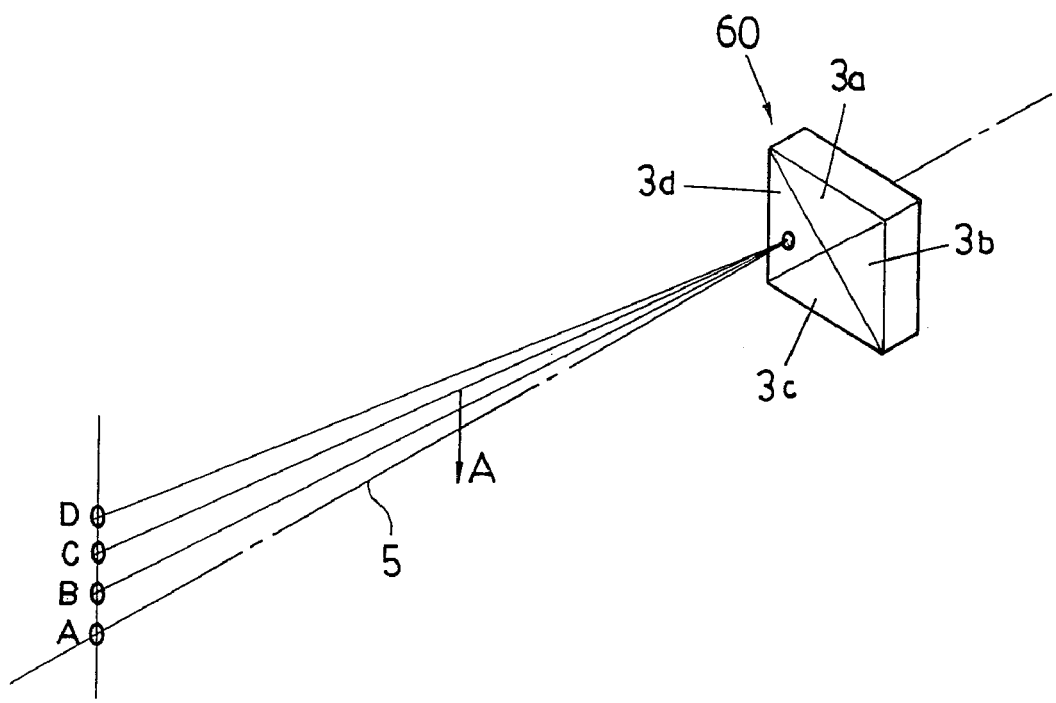
FIG. 10 is schematic view when one of cylindrical lens pieces of a cylindrical lens assembly is selected to perform optical axis adjustment of a laser beam.

FIG. 10 is a schematic view when the CR lens assembly 60 is placed such that the R surfaces of the four CR lens pieces 3a, 3b, 3c, and 3d face in the irradiation direction of a laser beam, and one of the CR lens pieces 3a, 3b, 3c, and 3d is selected to perform optical axis adjustment of the laser beam. Where arrangement is made such that when the CR lens piece 3a is selected to be at the laser beam passing position, the center position of its R surface is on an optical axis 5, the direction of the optical axis 5 is kept horizontal and unchanged (tilt at 0°), and when the CR lens pieces 3b, 3c, and 3d are selected in sequence to be at the laser beam passing position, the center positions of their R surfaces are deviated upward from the optical axis 5 by the distances shown in FIG. 7 respectively, whereby the horizontal optical axis 5 tilts upward by 1°, 2°, and 3° respectively, so that the position of a spot light at a predetermined distance from the CR lens assembly 60 varies as shown by A, B, C, and D. Further, the CR lens piece in any case provides an elliptical laser beam longer than it is wide.

In this case, the laser beam deflecting downward (in a direction shown by an arrow A) from the horizontal optical axis 5 is corrected by selecting one of the CR lens pieces 3b, 3c, and 3d, thereby allowing the direction of emission thereof to be substantially coincident with the horizontal optical axis 5.

Figure 11:
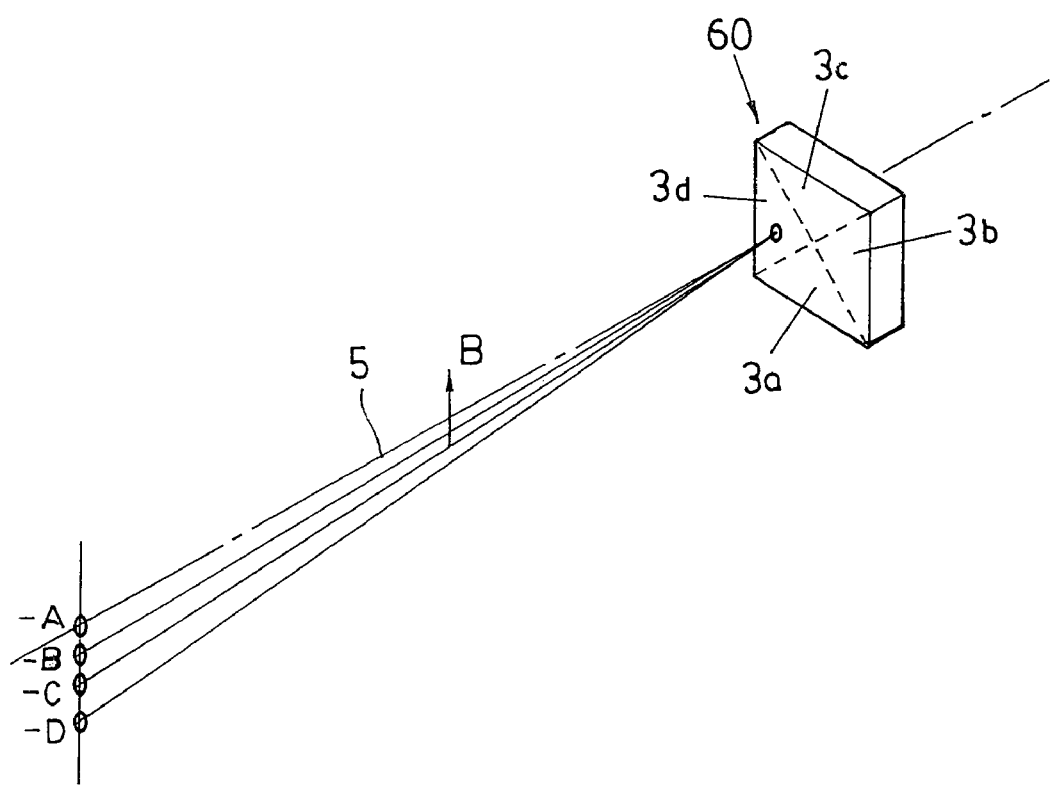
FIG. 11 is a schematic view when front and rear faces of the cylindrical lens assembly are reversed, and one of cylindrical lens pieces of a cylindrical lens assembly is selected to perform optical axis adjustment of a laser beam.

FIG. 11 is a schematic view when the CR lens assembly 60 is placed with its front and rear faces reversed such that the R surfaces of the CR lens pieces 3a, 3b, 3c, and 3d face in the direction of the light source, and one of the CR lens pieces 3a, 3b, 3c, and 3d is selected to perform optical axis adjustment of a laser beam. The boundary lines between the CR lens pieces are shown by broken lines for convenience for the purpose of discriminating this case from that in FIG. 10.

Also in this case, when the CR lens piece 3a is selected to be at the laser beam passing position, the center position of its R surface is on an optical axis 5, so that the direction of the optical axis 5 is kept horizontal and unchanged (tilt at 0°), and, in this state, when the CR lens pieces 3b, 3c, and 3d are selected in sequence to be at the laser beam passing position, the center positions of their R surfaces are deviated downward from the optical axis 5 by the distances shown in FIG. 7 respectively, whereby the horizontal optical axis 5 tilts downward 1°, 2°, and 3° respectively, so that the position of a spot light at a predetermined distance from the CR lens assembly 60 varies as shown by −B, −C, and −D. Further, the CR lens piece in any case provides an elliptical laser beam longer than it is wide.

In this case, the laser beam deflecting upward (in a direction shown by an arrow B) from the horizontal optical axis 5 is corrected by selecting one of the CR lens pieces 3b, 3c, and 3d, thereby allowing the direction of emission thereof to be substantially coincident with the horizontal optical axis 5.

Figure 12:
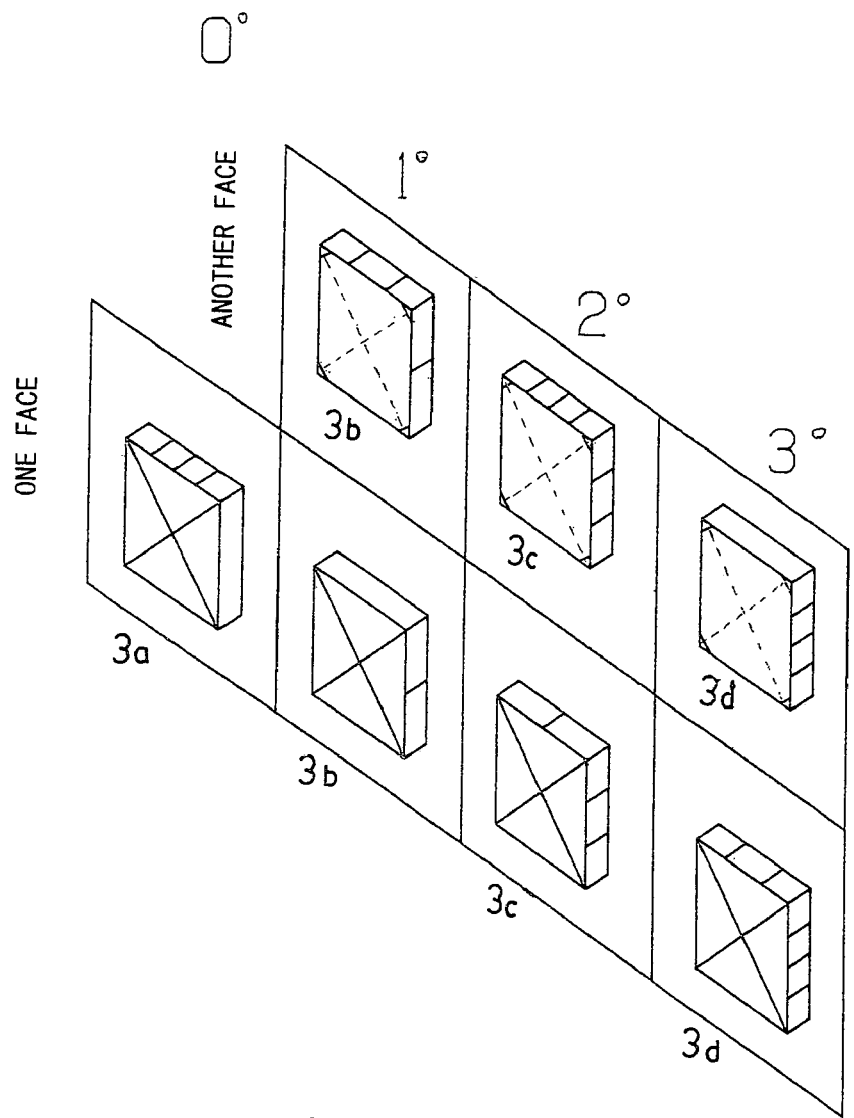
FIG. 12 is a view schematically showing seven kinds of selection states provided by a cylindrical lens assembly.

FIG. 12 is a view schematically showing selection states provided by the CR lens assembly that enables selection of these seven kinds of adjustment states. The selections states of CR lens pieces 3a, 3b, 3c, and 3d when the CR lens assembly 60 is placed such that one face (front face) with each of R surfaces of the CR lens pieces 3a, 3b, 3c, and 3d formed thereon faces in the irradiation direction of a laser beam, as in FIG. 10, are shown by the respective numerals and symbols on the lower tier. Further, the selections states of the CR lens pieces 3a, 3b, 3c, and 3d when the CR lens assembly 60 is placed such that another face (rear face) with each of flat surfaces of the CR lens pieces 3a, 3b, 3c, and 3d formed thereon faces in the irradiation direction of a laser beam, as in FIG. 11, are shown by the respective numerals and symbols on the upper tier. A CR lens piece 3a is not shown on the upper tier because the center position of the R surface is unchangeable even if its front and rear faces are reversed.

It should be noted that the boundary lines in the CR lens pieces 3a, 3b, 3c, and 3d in the CR lens assembly on the upper tier are shown by broken lines for convenience for the purpose of discriminating them from those on the lower tier. Further, numerical value examples of adjustment angles of the tilt of the optical axis at the time of selection of the CR lens pieces are shown on the upper side of the upper tier. However, the adjustment directions of the tilt of the optical axis are reversed between the selection states on the lower tier and the upper tier even when the same CR lens piece is selected, as described above.

Next, an adjustment example of the optical axis of a laser beam actually emitted from the laser beam generating part 20 will be described with FIG. 13.

Figure 13:
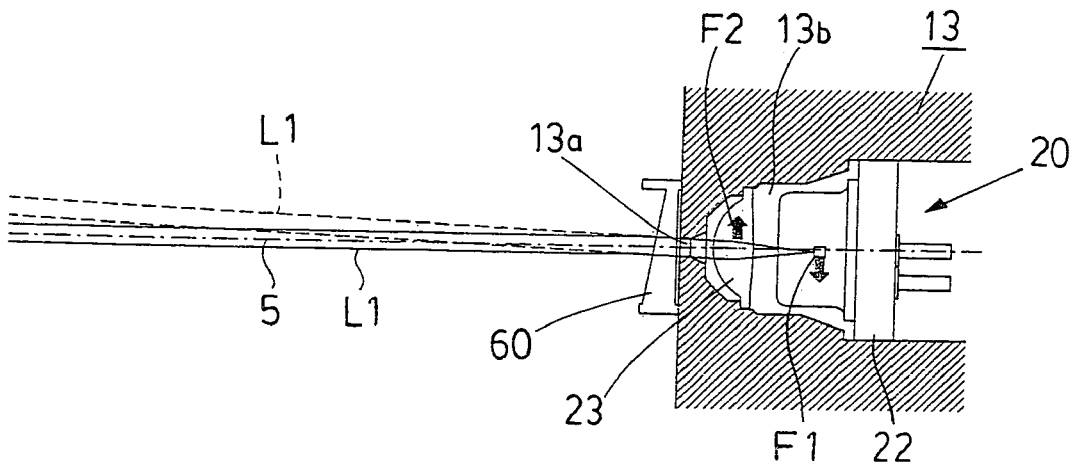
FIG. 13 is an explanatory view showing an example of optical axis adjustment of a laser beam actually emitted from a laser beam generating part.

An arrow F1 shown in FIG. 13 shows an error direction of a chip position of the laser diode in the light emitting unit 22, and an arrow F2 shows a positional deviation direction of the collimator lens 23.

As a result, the emission direction of a laser beam will deviate as shown by broken lines, but orientation of the CR lens assembly 60 as shown in FIG. 11, that is, selection of, for example, the CR lens piece 3c (establishment of the selection state at the middle on the upper tier in FIG. 12) allows the emission direction of the laser beam to be substantially coincident with the horizontal optical axis 5 as shown by a solid line.

Here, various examples of the CR lens assembly will be shown in FIG. 14 to FIG. 19. In these drawings, all of the CR lens assemblies are shown by numeral 6 for convenience, CR lens pieces forming them are shown by numerals a to f, and CR lens pieces b, c, and d when front and rear faces of the above CR lenses are reversed are shown by numerals b', c', and d' respectively.

Figure 14:
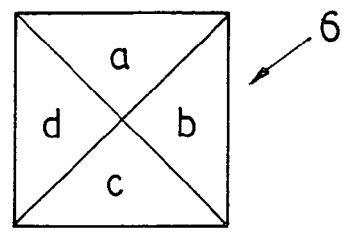
FIG. 14 is a plan view of a cylindrical lens assembly composed four right triangular cylindrical lens pieces.

FIG. 14 is a plan view of a basic form of the CR lens assembly 6 which is composed of four right triangular CR lens pieces a to d as in the above-described embodiment.

Figure 15:
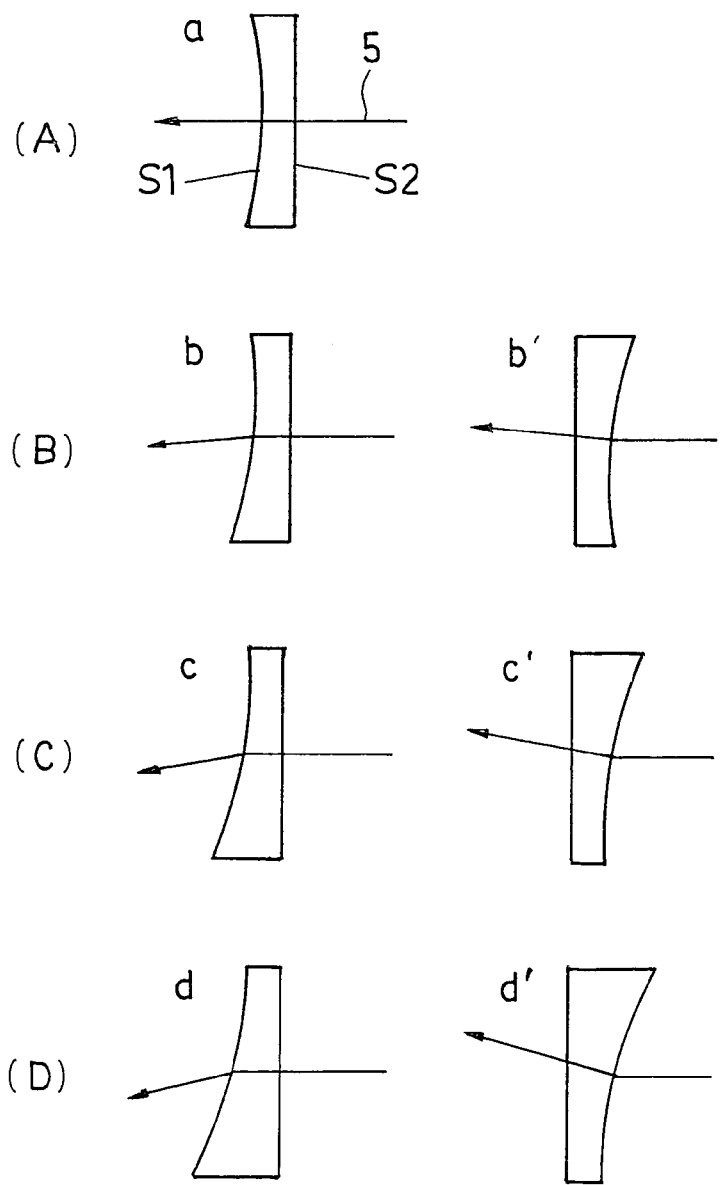
FIG. 15 is an explanatory view showing changes of the optical axes of laser beams passing through the cylindrical lens pieces of the same.

A part (A) to a part (D) in FIG. 15 show changes in the direction (tilt direction and tilt degree) of optical axes when laser beams pass through the center parts of the CR lens pieces a to d (including the CR lens pieces b' to d' when their front and rear faces are reversed).

In this case, each of the CR lens pieces a to d forming the CR lens assembly 6 has one face S1 that forms a cylindrical concave surface (R surface) having the same curvature and a different center position and another face S2 that is a flat surface orthogonal to the optical axis 5.

Figure 16:
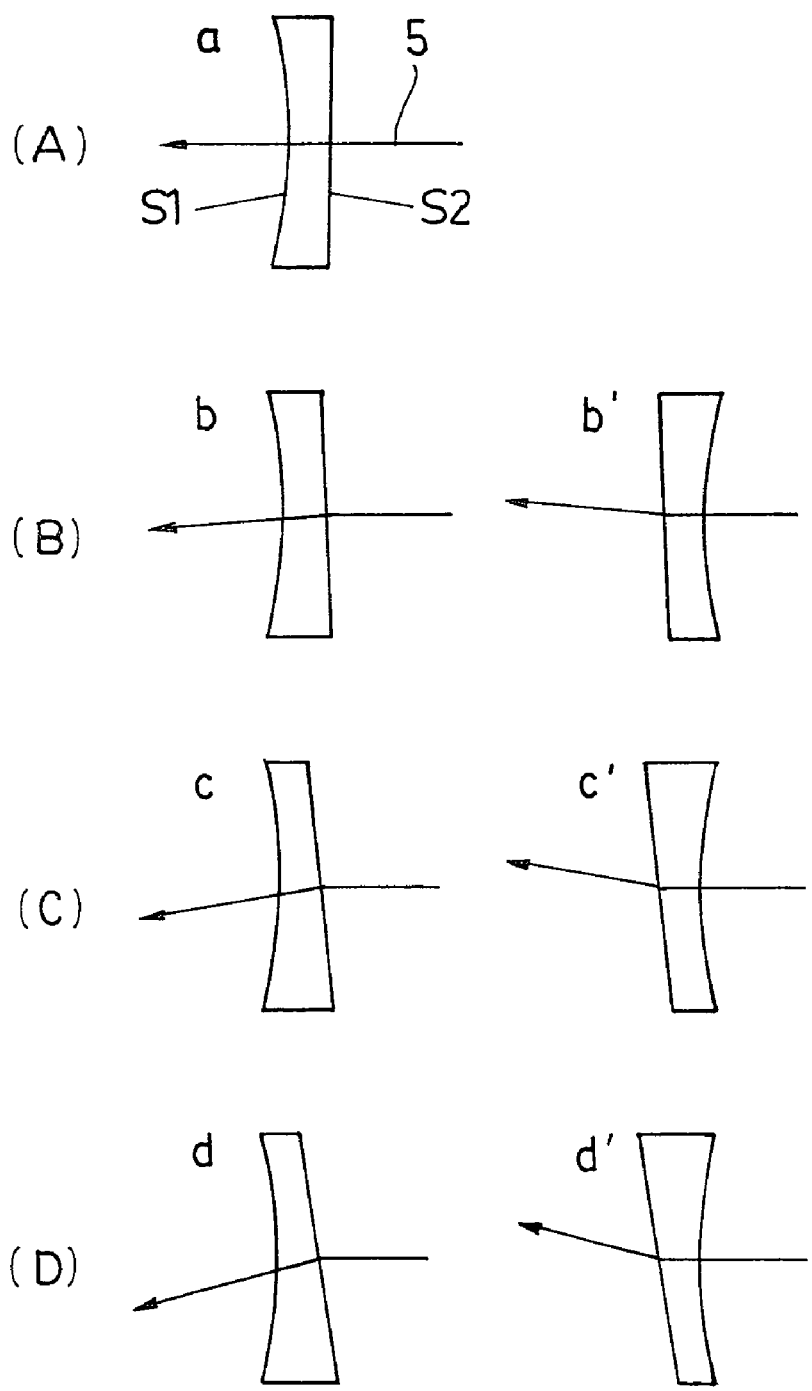
FIG. 16 is an explanatory view showing changes of the optical axes of laser beams passing through the cylindrical lens pieces when the cylindrical lens pieces are different in shape from those shown in FIG. 15.

A part (A) to a part (D) in FIG. 16 is a view, similar to the part (A) to the part (D) in FIG. 15, showing another example. The plan view of this example is the same as FIG. 14, but each of CR lens pieces a to d forming a CR lens assembly 6 has one face S1 that forms a cylindrical concave surface (R surface) having the same curvature and the same center position as well and another face S2 that is a flat surface tilting at a different angle to a curve direction of the cylindrical concave surface with respect to a direction orthogonal to the optical axis 5.

The CR lens pieces a to d of this CR lens assembly can also change, similarly to those shown in FIG. 15, the direction of the optical axes of laser beams passing therethrough.

Figure 17:
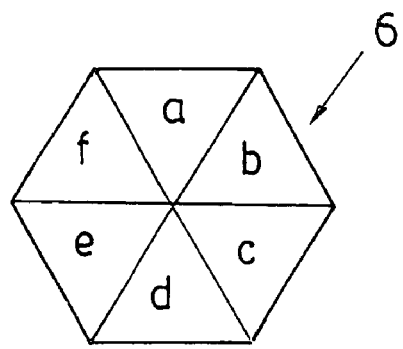
FIG. 17 is a plan view showing an example of a hexagonal cylindrical lens assembly composed of six triangular cylindrical lens pieces.
Figure 18:
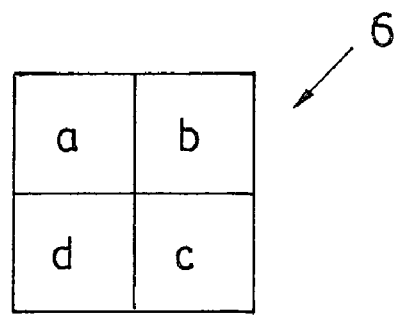
FIG. 18 is a plan view showing an example of a square cylindrical lens assembly composed of four square cylindrical lens pieces.
Figure 19:
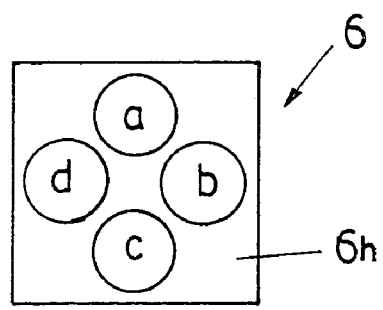
FIG. 19 is a plan view showing an example of a square cylindrical lens assembly composed of four circular cylindrical lens pieces and a support member thereof.

FIG. 17 to FIG. 19 show examples of the CR lens assembly having different plan shapes.

FIG. 17 is a plan view showing an example of a right hexagonal CR lens assembly composed of six equilateral triangular CR lens pieces a to f. Further, a right octagonal CR lens assembly can be composed of eight isosceles triangular CR lens pieces. As described above, one polygonal CR lens assembly 60 can be formed by joining four or more triangular CR lens pieces such that two sides of each one are adjacent to two sides of others. However, if the number of added CR lens pieces is too large, the area per one piece is decreased to cause difficulty in adjusting the optical axis, and therefore the illustrated examples are desirable.

FIG. 18 shows an example of a square CR lens assembly formed by joining four square CR lens pieces a to d such that two orthogonal sides of each one are adjacent to two sides of others.

FIG. 19 shows an example of a square CR lens assembly formed by joining and holding four circular CR lens pieces a to d on one plane by a support member 6h with a square outline. In this case, it is desirable to arrange the CR lens pieces a to d at an equal distance from their centers to the center of the support member 6h and at even angle intervals. It is also possible to join and hold six or eight circular CR lens pieces on one plane using a support member having an outline of a right hexagon or right octagon, thereby forming a right hexagonal or right octagonal CR lens assembly.

Both faces of each CR lens piece of each of the CR lens assemblies are a cylindrical concave surface and a flat surface similar to those of each of the CR lens pieces shown in FIG. 15 or FIG. 16.

The above-shown examples are for CR lens assemblies composed of four or more CR lens pieces, and it is also possible to form a square CR lens assembly by joining oblique sides of two right triangular CR lens pieces, or to form a square CR lens assembly by joining long sides of two rectangular CR lens pieces. Further, it is also possible to form one CR lens assembly by joining two or more circular or arbitrary plane shaped CR lens pieces.

As long as comprising at least two CR lens pieces having different center positions of the R surfaces or different tilts of planes, the CR lens assembly is used with its front and rear faces reversed when necessary, thereby allowing at least three or more kinds of optical axis adjustment states to be selected.

According to the embodiment of the invention using such CR lens assemblies, the following effects can be obtained.

(1) Each R surface (cylindrical concave surface) of the CR lens assembly widens a laser beam passing therethrough only in the vertical direction to deform it into an ellipse longer than it is wide and not in the horizontal direction, thereby making it possible to reduce noise caused by variations in printing or contamination and dust without changing the high resolution at the time of reading a bar code symbol from that by a circular laser beam that is the same in length and width. In other words, by widening a laser beam in the vertical direction that is the direction of bars of the bar code symbol, the possibility of error detection thereof can be reduced in terms of area.

(2) The area of a laser beam applied to the bar code symbol is similarly increased, so that optical noise caused by a spectacle pattern can be reduced. This is achieved through use of such a phenomenon that the area of a laser beam and the optical noise are in inverse proportion. It should be noted that since the bar code symbol has no information in the vertical direction, vertical widening of the irradiation spot exerts no influence.

(3) A plurality of CR lens pieces are combined to constitute a CR lens assembly, which is used to perform optical axis adjustment of a laser beam, and therefore the optical axis adjustment can easily be performed without specially providing an adjustment mechanism that is complicated and occupies much space. Actually, the adjustment is one of only about seven kinds according to this embodiment using the above-described CR lens assembly composed of four CR lens pieces.

Owing to the optical axis adjustment by the CR lens assembly, the variations in optical axes of laser beams are drastically decreased from ±4° in the prior art to ±(0.5 to 1)°.

Next, the configuration and operation of the vibration mirror driver 30 shown in FIG. 1 will be described in detail with reference to FIG. 20 to FIG. 22.

With a reduction in cost and size of the module for the optical information reader, it is necessary to improve details of components. However, a decrease in scanning accuracy due to the reduction in size should be avoided.

Although a conventional vibration mirror driver comprises a plurality of yokes and coils, either of them is composed of a single piece, whereby a reduction in space and cost can be achieved.

Besides, the movable magnet and the yoke are formed in round shapes (R shapes) in the prior art. This makes the gap between the movable magnet and the yoke uniform at any turn position and the magnetic flux density also uniform. However, the components in the R shapes require much effort in molding and increase cost as well.

If it is possible that the movable magnet is constituted of a rectangular parallelepiped sintered magnet and the yoke is constituted of a plate-shaped yoke, they can be manufactured without much effort and reduced in size.

It has been found that when the rectangular parallelepiped sintered magnet and the plate-shaped yoke are in use, there exist a part of high magnetic flux density and a part of low magnetic flux density, which cancel each other out, resulting in a constant density as a whole.

The yoke is logically usable if it is like an infinitely small point through use of its property that the magnet also rotates with its rotation, and therefore can be reduced in size.

Fine processing performed on components necessarily increases cost. For example, an oil pocket of a bearing is typically made by providing several grooves in the axial direction, but it is desirable to employ a simple processing method that allows a mold to have a simple structure in consideration of the entire cost.

The module for the optical information reader according to the invention is simplified in structure and reduced in size in consideration of these points, and devised to attain a necessary performance.

Figure 20:
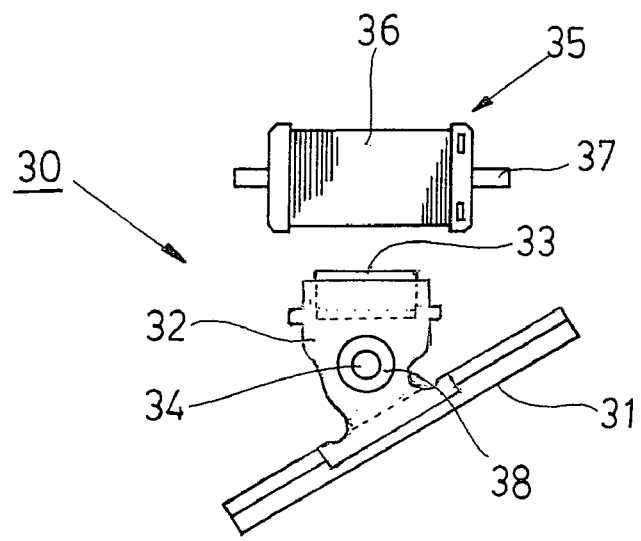
FIG. 20 is a plan view of the vibration mirror driver shown in FIG. 1.
Figure 21:
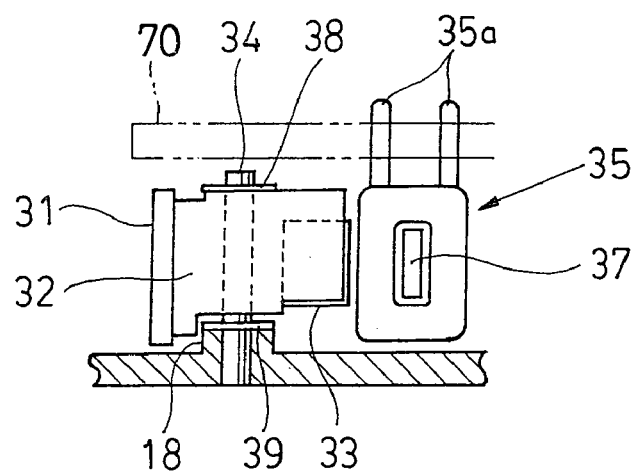
FIG. 21 is a side view of the same.

FIG. 20 is a plan view of the vibration mirror driver, and FIG. 21 is a side view of the same. In these drawings, numeral 31 denotes the vibration mirror for scanning, numeral 32 the vibration mirror holding member for holding the vibration mirror 31 adhered to the front end part, numeral 33 the movable magnet, and numeral 34 the support shaft for turnably supporting the vibration holding member. Further, the movable magnet 33 is fixed to the lower part of the rear face of the vibration mirror holding member on the opposite side to the vibration mirror 31 with respect to the support shaft 34.

Further, numeral 35 denotes the coil unit fixedly provided such as to oppose the movable magnet 33 with a space intervening therebetween, and is composed of the coil 36 and the thick plate-shaped yoke 37 provided through the coil 36 in a direction perpendicular to the winding direction of the coil 36.

Further, the movable magnet 33 and the yoke 37 out of operation (in a state where power is not fed to the coil 36) are in the form of straight, parallel to each other, and the sectional area of the yoke 37 in a direction orthogonal to the parallel direction is smaller than the sectional area of the movable magnet in the same direction. Two terminals 35a of the coil unit 35 are connected to a circuit board 70 as shown in FIG. 21.

The yoke 37 of the coil unit 35 is provided through the coil 36 perpendicularly to the winding direction of the coil 36 as described above, and is inserted into and secured to a pair of slits 16a and 16b formed in the sidewall part 12 and the inner wall part of the module casing 10 shown in FIG. 3, via the insulating member that also serves as a bobbin of the coil 36. This placement of the yoke 37, that is, the placement of the coil unit 35 is adjusted first in consideration of a magnetic force, and they are secured to that position.

The movable magnet 33 is placed slightly spaced from the coil unit 35. The rear part of the vibration mirror 31 is joined to the movable magnet 33 via the support shaft 34 that is secured perpendicularly to the module casing.

The support shaft 34 is covered with the vibration mirror holding member (holder) 32 that also serves as a slide bearing, and loosely holds both upper and lower faces in the axial direction of the vibration mirror holding member 32 by sliders 38 and 39 fitted to the support shaft 34. Therefore, the vibration mirror holding member 32 is configured to be freely movable with respect to the support shaft 34 in its axial direction within a predetermine range so as to be capable of performing very small amplitude movement.

The sliders 38 and 39 are composed of resin washers and function to prevent contact and interference so that the vibration mirror holding member 32 is in a floating state. In this state, the vibration mirror 31 is vibrated in a seesaw manner about the support shaft 34 by the function of electromagnetic induction by the coil unit 35 and the movable magnet 33.

Figure 22:
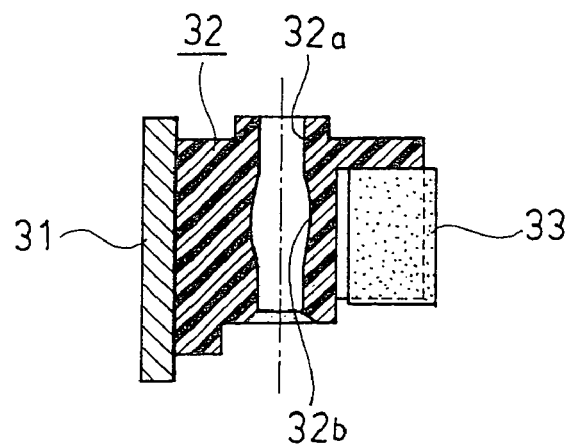
FIG. 22 is a cross-sectional view of a vibration mirror holding member and a member fixed thereto of the same.

Further, the vibration mirror holding member 32 is provided with a bearing hole 32a as shown in FIG. 22 to form a slide bearing structure. Further, the bearing hole 32a is formed to have a diameter at the inner middle part slightly larger than the diameter at both end parts so that the middle part gradually expands. This middle part forms an oil pocket 32b between the part and the support shaft 34 to be capable of storing silicon oil for lubricating the interface between the vibration mirror holding member 32 and the support shaft 34.

Figure 23:
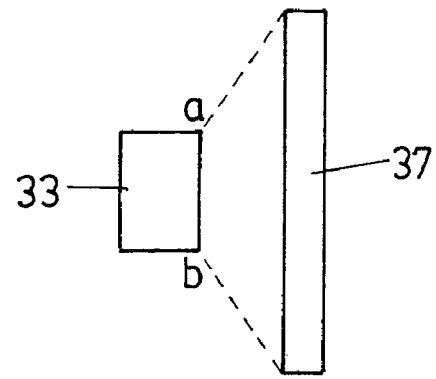
FIG. 23 is a view provided for explaining the magnetic flux distribution between a movable magnet and a yoke shown in FIG. 20, a schematic view of a state where a movable magnet 33 stands still.
Figure 24:
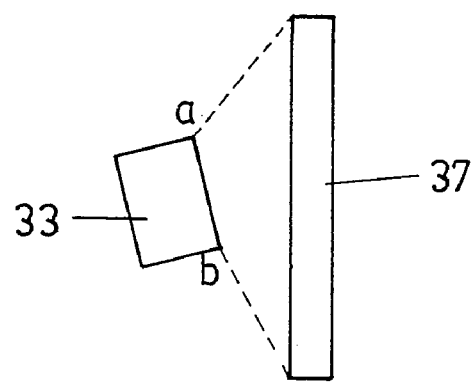
FIG. 24 is a schematic view showing a case in which the movable magnet is rotated 13.5 degrees of the same.
Figure 25:
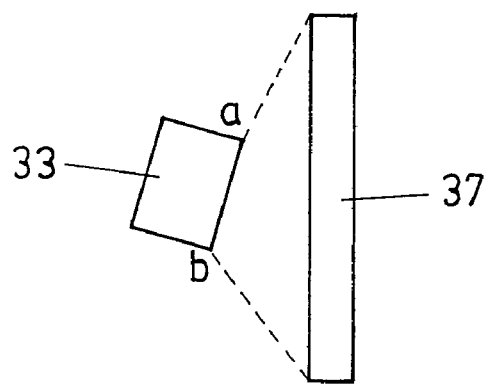
FIG. 25 is a schematic view showing a case in which the movable magnet is rotated −13.5 degrees of the same.

Next, simulations will be performed on changes in magnetism around the movable magnet 33 and the yoke 37 in the vibration mirror driver 30 having the above-described structure. FIG. 23 to FIG. 25 show simulations when the movable magnets 33 are rotated with the yokes 37 not moved.

FIG. 23 shows a state where the movable magnet 33 stands still. The magnetic flux density is distributed in a manner to become lower as it goes farther with a part where the movable magnet 33 and the yoke 37 are closest to each other as a center. The part of high magnetic flux density and the part of low magnetic flux density cancel each other out in this state, resulting in a constant magnetic flux density as a whole.

FIG. 24 shows a case in which the movable magnet 33 is rotated 13.5° to the left in the drawing. Unlike the above-described standing still state, the magnetic flux density is uniformly distributed around the yoke 37. The rotation of the movable magnet 33 causes one edge a of a face opposing the yoke 37 to become distant from the yoke 37 and another edge b to come close to the yoke 37. Naturally, the magnetic flux density around the one edge a which has become distant becomes lower, and the magnetic flux density around the other edge b which has come close becomes higher. However, the low part and the high part cancel each other out even though the magnet 33 is rotated, resulting in a constant magnetic flux density as a whole.

FIG. 25 shows a case in which the movable magnet 33 is rotated −13.5° to the right in the drawing. The rotation direction is opposite to that of the case in FIG. 24, and therefore one edge a of the movable magnet 33 comes close to the yoke 37 and another edge b becomes distant from the yoke 37. In this case, the distribution of the magnetic flux density becomes like the distribution in FIG. 24 vertically reversed, resulting in a constant magnetic flux density as a whole also in this case. Accordingly, the vibration mirror 31 can always be turned right and left with a constant magnetic flux density.

Figure 26:
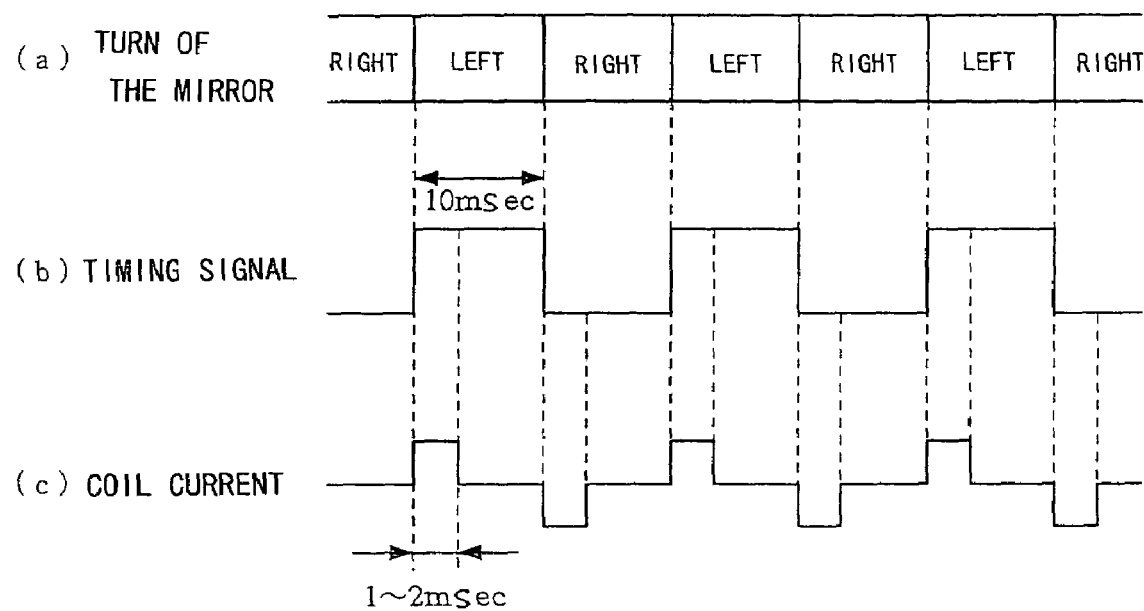
FIG. 26 is a diagram showing waveforms of a timing signal for turning the vibration mirror in FIG. 20 right and left and a coil current.

FIG. 26 is a diagram showing waveforms of a timing signal for turning the vibration mirror 31 right and left and a current fed through the coil 36. A part (a) shows the turn direction of the vibration mirror 31, a part (b) shows the waveform of the timing signal, and a part (c) shows the coil current.

The waveform of the timing signal is a rectangular wave that reverses every 10 msec, and a current of 10 mA to 20 mA with a pulse width of 1 msec to 2 msec is fed, as the coil current, alternately in opposite directions every rising time and falling time of the timing signal.

The vibration mirror driver is characterized in the following points.

(1) In the coil unit 35, the yoke 37 is provided through the coil 36 in the direction perpendicular to the winding direction thereof.

(2) The movable magnet 33 and the yoke 37 are formed not in round shape but flat.

(3) The transverse section of the yoke 37 is made smaller than the transverse section of the movable magnet 33.

(4) The vibration mirror holding member 32 is made slidable in the axial direction of the support shaft 34.

(5) The oil pocket 32b is formed by increasing the diameter of the middle part of the bearing hole 32a of the vibration mirror holding member 32.

With this vibration mirror driver, the following effects can be obtained.

(1) The yoke 37 is secured, provided through the coil unit 35 in the direction perpendicular to the winding direction of the coil 36, whereby the number of members can be reduced.

(2) The magnet and the yoke, which are formed in R shape (round shape) in the prior art, are formed in flat shape such as a rectangular parallelepiped or a straight rod, whereby the space in the module can be reduced to realize a reduced size module, leading to reduced cost.

(3) The yoke is reduced in size, whereby the weight of the driver part can be reduced. Further, the size of the transverse section of the yoke is made smaller than the transverse section of the movable magnet, thereby providing improvement in positioning accuracy due to magnetic levitation.

(4) The vibration mirror holding member 32 and the vibration mirror 31 and movable magnet 33 which are integrated therewith are made slidable in the axial direction of the support shaft 34 and kept in a floating state, whereby they have little resistance at the time of turn and thus can be smoothly turned by a small driving force, so that the movable magnet 33 and the coil unit 35 can be further reduced in size as well as save in power consumption.

(5) The oil pocket of the bearing part is formed to have a gently curved cross section, resulting in a simple structure and can be produced at low cost.

The shield effect of an electronic circuit, especially, an LSI in the module for the optical information reader will be described here.

As described above with FIG. 4, in this module for the optical information reader according to the invention, when the circuit board 70 which conducts signal processing and various controls is screwed to the top face of the module casing 10 while also serving as the top cover, the LSI 71 mounted on the circuit board 70 is accommodated in the LSI accommodating recessed part 14 of the metal module casing 10 to be shielded with a metal face at the periphery. Further, if the layer where the wiring layer of the circuit board 70 is formed into a shield layer, the top face of the LSI 71 can also be shielded.

Therefore, the LSI 71 is substantially sealed by the metal box of the module casing 10 and the shield layer of the circuit board 70, into a desirable state. This can prevent influence of electromagnetic wave noise generated by other electronic equipment, mobile phone, and so on.

Figure 27:
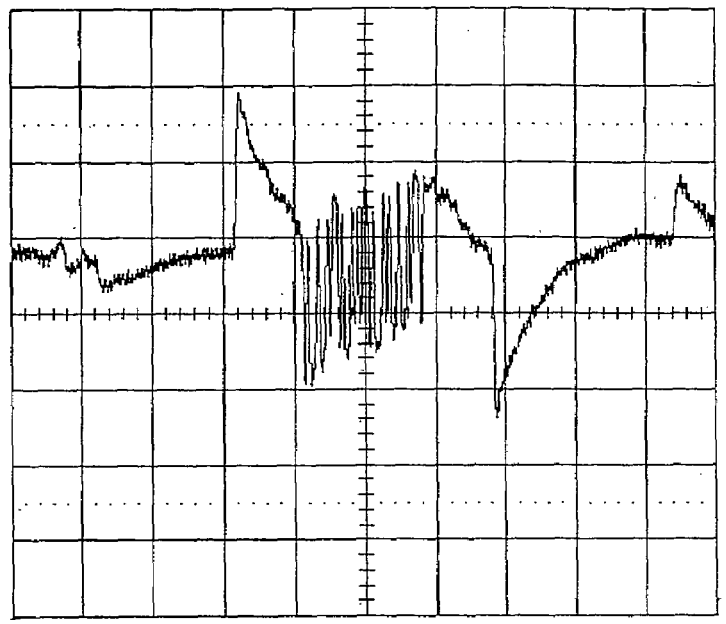
FIG. 27 is a simulation waveform diagram of a detection signal when an electromagnetic wave noise at about 30 KHz is superimposed using a module according to the invention.
Figure 28:
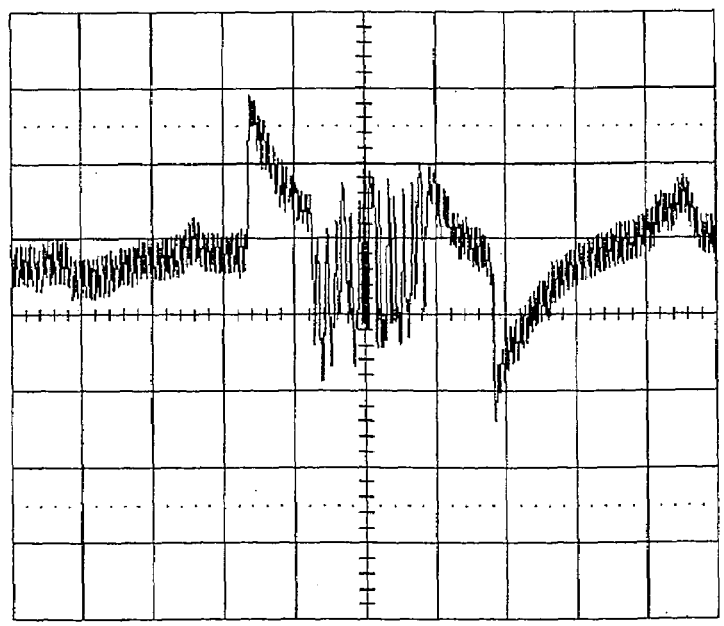
FIG. 28 is a simulation waveform diagram of a detection signal when an electromagnetic wave noise at about 30 KHz is superimposed using a conventional module.

FIG. 27 and FIG. 28 show simulation waveforms when an electromagnetic wave noise at about 30 KHz is superimposed, FIG. 27 showing a waveform of a detection signal in a case of using the module according to the embodiment of the invention and FIG. 28 showing a waveform of a detection signal in a case of using a conventional module in which an LSI is placed on the top face of a circuit board, respectively. The part where the amplitude of the waveform greatly varies is a part for reading a bar code symbol.

As is clear from comparison between FIG. 27 and FIG. 28, an electromagnetic wave noise of about 0.3 Vpp is superimposed on the waveform in FIG. 28. On the waveform in FIG. 27, the amplitude of the noise is very small. This shows that the influence of the noise can be avoided by the above-described embodiment of the invention.

Figure 29:
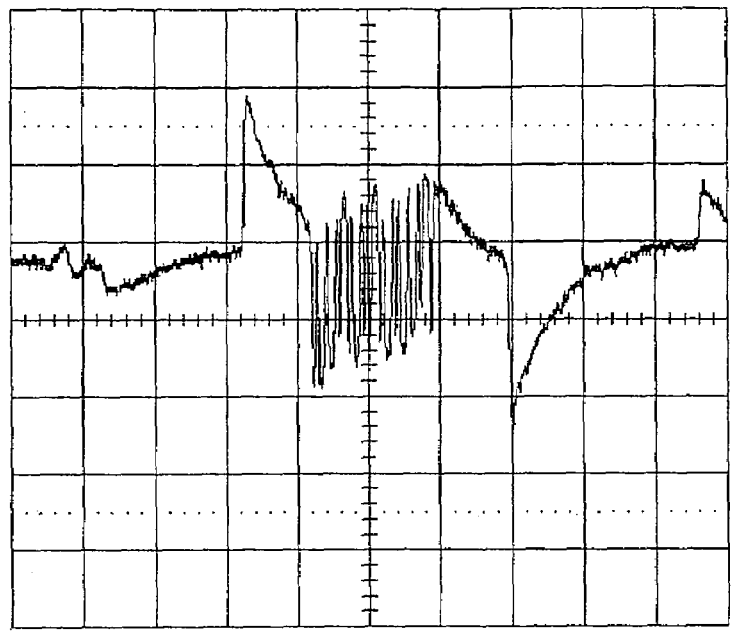
FIG. 29 is a simulation waveform diagram of a detection signal when a mobile phone is used near the module according to the invention.
Figure 30:
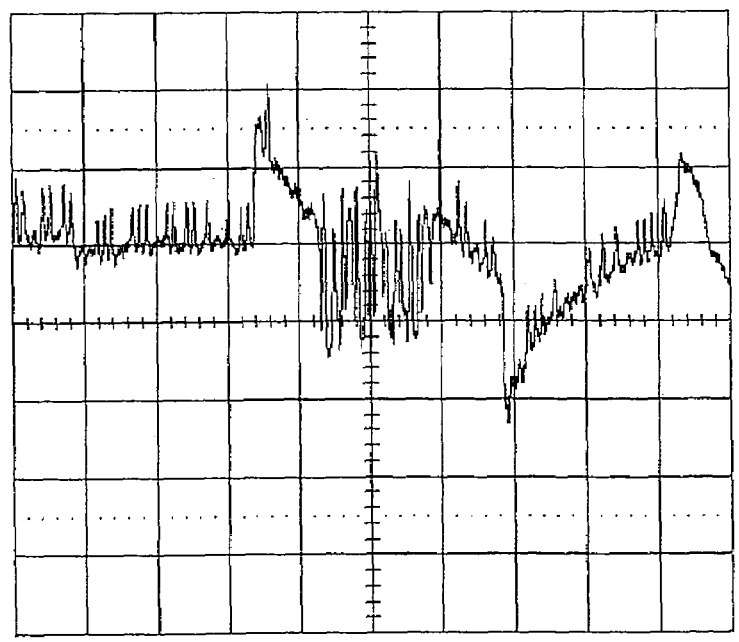
FIG. 30 is a simulation waveform diagram of a detection signal when a mobile phone is used near the conventional module.

FIG. 29 and FIG. 30 show simulation waveforms when a mobile phone is used near the module, FIG. 29 showing a waveform of a detection signal in a case of using the module according to the embodiment of the invention and FIG. 30 showing a waveform of a detection signal in a case of using the conventional module in which the LSI is placed on the top face of the circuit board, respectively.

In comparison between the simulation results, an electromagnetic wave noise of about 0.3 Vpp due to the influence of the mobile phone is superimposed in the case of the conventional device shown in FIG. 30, whereas the noise is very little in the case of the device of the invention shown in FIG. 29. This shows that according to the above-described embodiment of the invention, even though a strong electromagnetic wave such as from a mobile phone occurs, the noise can be substantially reduced so that information such as a bar code symbol can be accurately read at all times.

INDUSTRIAL APPLICABILITY

As has been described, according to the invention, it is possible to modularize the primary part of the optical information reader of the light beam scanning type, simplify the structures of attachment parts of the light emitting unit and the collimator lens, and enable read with high accuracy, so as to realize a reduction in size and price of the optical information reader.

Further, the optical axis adjustment of a laser beam is facilitated, and most of the variation with time and the influence of optical noise or electromagnetic wave noise are eliminated, thus enabling information read with high accuracy for a long time.

What is claimed is:

1. A module for an optical information reader in which at least a light emitting unit with a laser diode as a light source, a collimator lens, a vibration mirror for scanning, a condensing mirror or a condensing lens, and a light receiving unit are installed in a module casing for modularization, wherein said module casing is provided with a lens-barrel hole having an opening at one end face thereof and an aperture formed at a tip face thereof and having a press-fit part, provided between the opening and the tip face, into which said light emitting unit is to be press-fitted, said collimator lens is adhered to a tip bottom part of said lens-barrel hole, and said light emitting unit is press-fitted into said press-fit part in order to position a light emitting point of the laser diode slightly farther than a focus point of the collimator lens, wherein said lens-barrel hole has said press-fit part of which an inner peripheral face is a cylindrical face with an inner diameter slightly smaller than an outer diameter of said light emitting unit that is to be press-fitted thereinto, and has a tapered press-fit guide part that is formed near the opening and has an inner peripheral face gradually increasing in inner diameter toward the opening.

2. A module for an optical information reader in which at least a light emitting unit with a laser diode as a light source, a collimator lens, a vibration mirror for scanning, a condensing mirror or a condensing lens, and a light receiving unit are installed in a module casing for modularization, wherein said module casing is provided with a lens-barrel hole having an opening at one end face thereof and an aperture formed at a tip face thereof and having a press-fit part, provided between the opening and the tip face, into which said light emitting unit is to be press-fitted, said collimator lens is adhered to a tip bottom part of said lens-barrel hole, and said light emitting unit is press-fitted into said press-fit part in order to position a light emitting point of the laser diode slightly farther than a focus point of the collimator lens, wherein a cylindrical lens assembly comprising a plurality of cylindrical lens pieces integrally joined is provided between said light emitting unit and said vibration mirror, wherein each of said plurality of cylindrical lens pieces has one face that forms a cylindrical concave surface having the same curvature and a different center position and another face that is a flat surface orthogonal to an optical axis, and wherein one of said plurality of cylindrical lens pieces is selected and inserted into a passing position of a laser beam generated by said light emitting unit to enable adjustment of an optical axis of the laser beam.

3. A module for an optical information reader in which at least a light emitting unit with a laser diode as a light source, a collimator lens, a vibration mirror for scanning, a condensing mirror or a condensing lens, and a light receiving unit are installed in a module casing for modularization, wherein said module casing is provided with a lens-barrel hole having an opening at one end face thereof and an aperture formed at a tip face thereof and having a press-fit part, provided between the opening and the tip face, into which said light emitting unit is to be press-fitted, said collimator lens is adhered to a tip bottom part of said lens-barrel hole, and said light emitting unit is press-fitted into said press-fit part in order to position a light emitting point of the laser diode slightly farther than a focus point of the collimator lens, wherein a cylindrical lens assembly comprising a plurality of cylindrical lens pieces integrally joined is provided between said light emitting unit and said vibration mirror, wherein each of said plurality of cylindrical lens pieces has one face that forms a cylindrical concave surface having the same curvature and the same center position and another face that is a flat surface tilting at a different angle to a curve direction of the cylindrical concave surface with respect to a direction orthogonal to an optical axis, and wherein one of said plurality of cylindrical lens pieces is selected and inserted into a passing position of a laser beam generated by said light emitting unit to enable adjustment of an optical axis of the laser beam.

4. A module for an optical information reader in which at least a light emitting unit with a laser diode as a light source, a collimator lens, a vibration mirror for scanning, a condensing mirror or a condensing lens, and a light receiving unit are installed in a module casing for modularization, wherein said module casing is provided with a lens-barrel hole having an opening at one end face thereof and an aperture formed at a tip face thereof and having a press-fit part, provided between the opening and the tip face, into which said light emitting unit is to be press-fitted, said collimator lens is adhered to a tip bottom part of said lens-barrel hole, and said light emitting unit is press-fitted into said press-fit part in order to position a light emitting point of the laser diode slightly farther than a focus point of the collimator lens, wherein said module casing is made of metal and formed with an LSI accommodating recessed part, and wherein a circuit board with a shield layer and an LSI mounted thereon for forming a circuit for signal processing and control is attached to an open face of said module casing with the LSI accommodated in said LSI accommodating recessed part, and the LSI is shielded with a metal face of said module casing and the shield layer of the circuit board.

* * * * *